United States Patent
Lee et al.

(10) Patent No.: US 10,423,566 B2
(45) Date of Patent: Sep. 24, 2019

(54) ELECTRONIC DEVICE AND METHOD FOR CONTROLLING EXTERNAL ELECTRONIC DEVICE CONNECTED TO USB TYPE-C CONNECTOR

(71) Applicant: Samsung Electronics Co., Ltd., Gyeonggi-do (KR)

(72) Inventors: Wookwang Lee, Suwon-si (KR); Byungjun Kim, Seoul (KR); Dongrak Shin, Gwangju-si (KR); Jaejin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/926,932

(22) Filed: Mar. 20, 2018

(65) Prior Publication Data

US 2018/0276178 A1 Sep. 27, 2018

(30) Foreign Application Priority Data

Mar. 24, 2017 (KR) .......... 10-2017-0037781

(51) Int. Cl.
*G06F 13/42* (2006.01)
*G06F 13/10* (2006.01)

(52) U.S. Cl.
CPC ........ *G06F 13/4282* (2013.01); *G06F 13/102* (2013.01); *G06F 13/4295* (2013.01); *G06F 2213/0042* (2013.01)

(58) Field of Classification Search
CPC ........ H04L 29/06; H04L 69/18; G06F 3/1236

USPC .......... 370/252, 389, 466; 710/72, 305, 104, 710/105
See application file for complete search history.

(56) References Cited

U.S. PATENT DOCUMENTS

| | | | | |
|---|---|---|---|---|
| 7,716,379 B2* | 5/2010 | Ruan | ...................... | G06F 13/387 709/224 |
| 10,186,815 B2* | 1/2019 | Shen | ................... | H01R 13/6666 |
| 2008/0046628 A1* | 2/2008 | Hunsaker | ............... | G06F 13/423 710/315 |
| 2008/0263252 A1* | 10/2008 | Habuto | ................. | G06F 1/1632 710/303 |
| 2009/0158069 A1* | 6/2009 | Oh | ........................ | G06F 1/3203 713/323 |
| 2012/0124121 A1* | 5/2012 | Pope | ................... | H04L 49/9094 709/201 |
| 2012/0284395 A1* | 11/2012 | Miyashita | ........... | H04L 41/0816 709/224 |

(Continued)

*Primary Examiner* — Faisal M Zaman

(57) ABSTRACT

In an electronic device and a method for operating the electronic device according to various embodiments, the electronic device may comprise a housing, a USB Type-C connector configured to be connected to the housing or exposed through the housing and to include at least one configuration channel (CC) pin, a circuit configured to be disposed in the housing and connected electrically to the connector, and a processor configured to be disposed in the housing and connected electrically to the circuit. The circuit may be configured to transmit and receive a packet through the CC pin. The packet may sequentially comprise a message header, a first vendor defined message (VDM) header, and a second VDM header including a product identifier and a data type. Further, various other embodiments can be implemented according to the present disclosure.

19 Claims, 18 Drawing Sheets

(56) References Cited

U.S. PATENT DOCUMENTS

| | | | |
|---|---|---|---|
| 2015/0095739 A1* | 4/2015 | Zhovnirnovsky | H03M 13/616 714/759 |
| 2015/0293514 A1* | 10/2015 | Tupala | G06F 1/266 700/295 |
| 2015/0370299 A1* | 12/2015 | Waters | G06F 1/26 713/310 |
| 2016/0170929 A1* | 6/2016 | Pethe | G06F 13/102 710/313 |
| 2016/0217307 A1* | 7/2016 | Huang | G06F 13/385 |
| 2016/0227157 A1* | 8/2016 | Zhong | G09G 5/18 |
| 2016/0259746 A1 | 9/2016 | Huang et al. | |
| 2016/0291987 A1* | 10/2016 | Lin | G06F 9/4411 |
| 2016/0306616 A1* | 10/2016 | Tomppo | G06F 8/65 |
| 2017/0068637 A1* | 3/2017 | Lais | G06F 13/16 |
| 2017/0359417 A1* | 12/2017 | Chen | H04L 67/12 |
| 2018/0004694 A1* | 1/2018 | Nemoto | G06F 11/3027 |
| 2018/0321725 A1* | 11/2018 | Shao | G06F 13/4282 |
| 2019/0011386 A1* | 1/2019 | Park | G01N 27/048 |

\* cited by examiner

ELECTRONIC DEVICE AND METHOD FOR CONTROLLING EXTERNAL ELECTRONIC DEVICE CONNECTED TO USB TYPE-C CONNECTOR

CROSS-REFERENCE TO RELATED APPLICATION(S)

This application is related to and claims priority under 35 U.S.C. § 119(a) to Korean Patent Application No. 10-2017-0037781 filed on Mar. 24, 2017, the entire disclosure of which is hereby incorporated by reference.

TECHNICAL FIELD

The present disclosure relates to an electronic device and a method for operating the electronic device and, more particularly, to a technology of controlling an external electronic device connected through a USB Type-C connector.

BACKGROUND

Various electronic devices such as a smart phone, tablet personal computer (PC), portable multimedia player (PMP), personal digital assistant (PDA), laptop PC, and wearable device have become popular.

Recently, various electronic devices are being equipped with a port for connecting an external electronic device in a wired system. Various standards define the port, and one of the most widely used standards is a universal serial bus (USB) type.

The USB is an input/output standard widely used for connecting an electronic device and an external electronic device.

SUMMARY

An electronic device connecting to an external electronic device by using a USB Type-C standard can transmit and receive a control signal through a configuration channel (hereinafter, CC) defined by the USB Type-C standard. Signals transmitted and received through the CC may include a signal of a vendor defined message (VDM). The VDM is a signal allocated by a manufacturer of an electronic device or an external electronic device, and the VDM can be used for controlling a signal transmitted and received between the external electronic device and the electronic device. In the USB specification, the size of data included in the VDM is limited to a maximum of 24 bytes; therefore, a control signal (or data) having a capacity greater than 24 bytes may be limited in being transmitted through the CC.

The VDM transmitted from the external electronic device to the electronic device through the USB Type-C may include a manufacturer identifier of the external electronic device. However, the electronic device cannot identify each identifier of various external electronic devices produced by one manufacturer. For example, if a plurality of products are equipped in the external electronic device connected to the electronic device through a USB Type-C connector (although each product can be distinguished by product identifiers), VDMs of corresponding products transmitted and received between the electronic device and the external electronic device through the connector cannot be distinguished.

The electronic device can perform an operation of authenticating various external electronic devices connected through the USB Type-C connector. In case of data for authentication, the size of encrypted data may become greater than the size of data before the encryption. Like this, the encrypted data used for authenticating the external electronic devices may be limited in transmitting a VDM because of the data size.

An electronic device and a method for operating the electronic device according to various embodiments of the present disclosure can transmit data having a large capacity or encrypted authentication data by using a plurality of VDMs.

An electronic device according to various embodiments of the present disclosure may comprise a housing, a USB Type-C connector configured to be connected to the housing or exposed through the housing and to include at least one configuration channel (CC) pin, a circuit configured to be disposed in the housing and connected electrically to the connector, and a processor configured to be disposed in the housing and connected electrically to the circuit. The circuit may be configured to transmit and receive a packet through the CC pin. The packet may sequentially comprises a message header, a VDM header, and a second VDM header including a product identifier and a data type.

A method for controlling an external electronic device connected to a USB Type-C connector of an electronic device according to various embodiments of the present disclosure may comprise the operations of identifying whether an external electronic device is connected through a USB Type-C connector including at least one CC pin, identifying device identification information of the external electronic device based on information received from the external electronic device through the CC pin, and transmitting VDMs including encrypted information used for authenticating the external electronic device or command information for controlling the external electronic device to the external electronic device through the CC pin.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
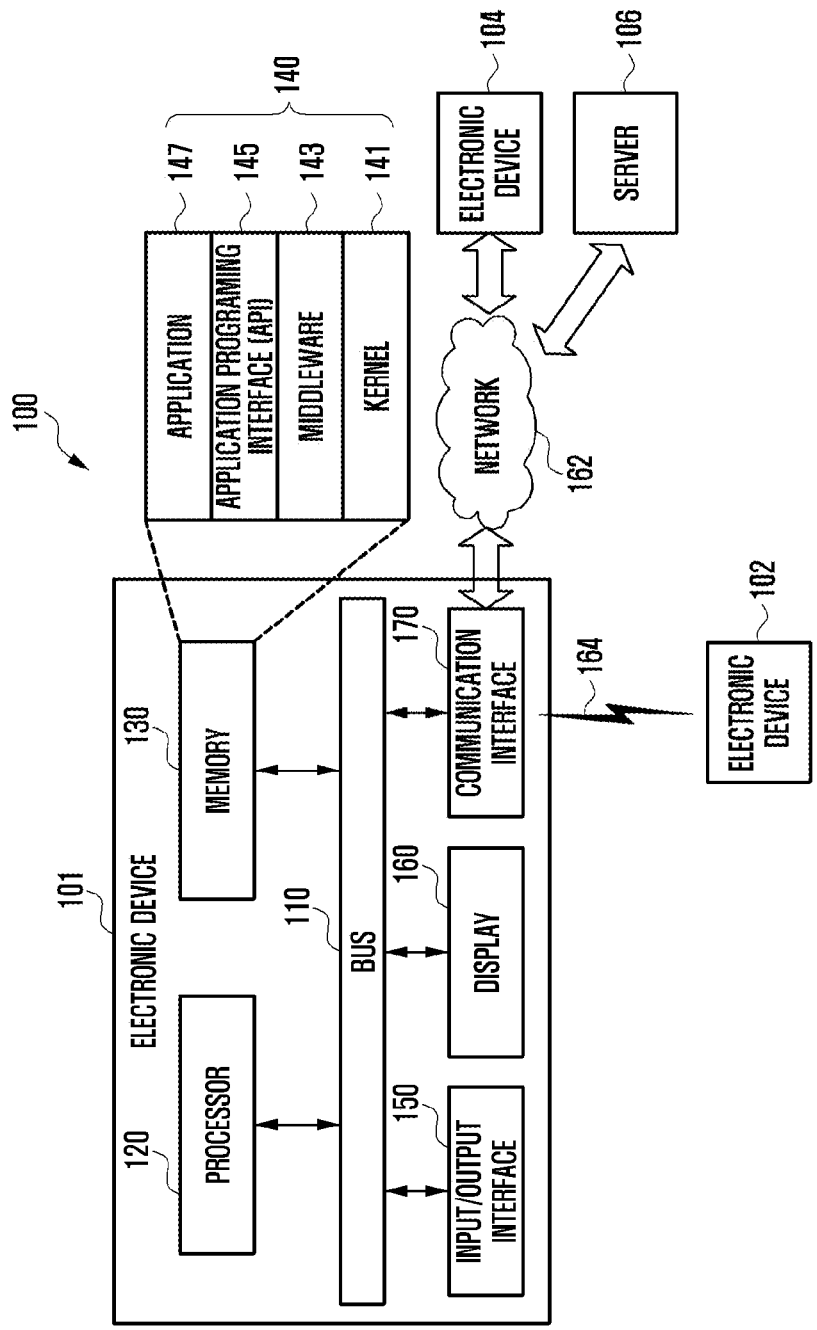
FIG. 1 illustrates an electronic device in a network environment according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following detailed description is made with reference to the accompanying drawings and is provided to aid in understanding the present disclosure. The present disclosure includes various details to assist in that understanding but these are to be regarded as merely examples. Accordingly, those of ordinary skill in the art will recognize that various changes and modifications of the various example embodiments described herein may be made without departing from the scope and spirit of the present disclosure as defined by the appended claims and their equivalents. In addition, descriptions of well-known functions and constructions may be omitted for clarity and conciseness.

The terms used in the following detailed description and claims are not limited to their dictionary meanings, but may simply be used to enable a clear and consistent understanding of the present disclosure. Accordingly, it is intended that the following description of various embodiments of the present disclosure is provided for illustration purposes only and not for the purpose of limiting the present disclosure as defined by the appended claims and their equivalents.

It is intended that the singular forms "a," "an," and "the" include plural referents unless the context clearly dictates otherwise. Thus, for example, reference to "a component surface" includes reference to one or more of such surfaces.

The term "substantially" may generally refer to a recited characteristic, parameter, or value that need not be achieved exactly, but that deviations or variations, including for example, tolerances, measurement error, measurement accuracy limitations and other factors known to those of ordinary skill in the art, may occur in amounts that do not preclude the effect the characteristic was intended to provide.

The expressions "include" and "may include" which may be used in the present disclosure may refer, for example, to the presence of disclosed functions, operations, and elements but are not intended to limit one or more additional functions, operations, and elements. In the present disclosure, the terms "include" and/or "have" may be understood to refer, for example, to a certain characteristic, number, operation, element, component or a combination thereof, but are not intended to be construed to exclude the existence of or a possibility of addition of one or more other characteristics, numbers, operations, elements, components or combinations thereof.

Furthermore, in the present disclosure, the expression "and/or" includes any and all combinations of the associated listed words. For example, the expression "A and/or B" may include A, B, or both A and B.

In an embodiment of the present disclosure, expressions including ordinal numbers, such as "first" and "second," and the like, may modify various elements. However, such elements are not limited by the above expressions. For example, the above expressions do not limit the sequence and/or importance of the elements. The above expressions are used merely to distinguish an element from other elements. For example, a first user device and a second user device may indicate different user devices, but both of them are user devices. For example, a first element may be referred to as a second element, and similarly, a second element may be also be referred to as a first element without departing from the scope of the present disclosure.

In a case where a component is referred to as being "connected" to or "accessed" by another component, it is intended that not only the component is directly connected to or accessed by the other component, but also there may exist another component between them. In addition, in a case where a component is referred to as being "directly connected" to or "directly accessed" by another component, it is intended that there is no component therebetween.

An electronic device according to the present disclosure may be a device including a communication function. For example, and without limitation, the device may correspond to a combination of at least one of a smartphone, a tablet personal computer (PC), a mobile phone, a video phone, an electronic-book (e-book) reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, a vacuum, an oven, a microwave, a washing machine, an air cleaner, and the like), an artificial intelligence robot, a television (TV), a digital versatile disc (DVD) player, an audio device, various medical devices (for example, a magnetic resonance angiography (MRA) device, a magnetic resonance imaging (MRI) device, a computed tomography (CT) device, a scanning machine, an ultrasonic wave device, and the like), a navigation device, a global positioning system (GPS) a receiver, an event data recorder (EDR), a flight data recorder (FDR), a set-top box, a TV box (for example, Samsung HomeSync®, Apple TV®, or Google TV™), an electronic dictionary, vehicle infotainment device, an electronic equipment for a ship (for example, navigation equipment for a ship, gyrocompass, and the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, or the like. It will be apparent to those skilled in the art that an electronic device according to the present disclosure is not limited to the aforementioned devices.

FIG. 1 illustrates a block diagram of an electronic device 101 in a network environment 100 according to an embodiment of the present disclosure.

Referring to FIG. 1, the electronic device 101 may include a bus 110, a processor (e.g., including processing circuitry) 120, a memory 130, an input/output interface (e.g., including interface circuitry) 150, a display 160, a communication interface (e.g., including communication circuitry) 170, and other similar and/or suitable components.

The bus 110 may be a circuit which interconnects the above-described elements and delivers a communication (e.g., a control message) between the above-described elements.

The processor 120 may include various processing circuitry and receive commands from the above-described other elements (e.g., the memory 130, the input/output interface 150, the display 160, the communication interface 170, and the like) through the bus 110, interpret the received commands, and execute a calculation or process data according to the interpreted commands. Although illustrated as one element, the processor 120 may include multiple processors and/or cores without departing from the scope and spirit of the present disclosure. The processor 120 may include various processing circuitry, including a microprocessor or any suitable type of processing circuitry, such as, for example, and without limitation, one or more central processing units (CPUs), general-purpose processors (e.g., advanced reduced instruction set (RISC) machine (ARM) based processors), a digital signal processor (DSP), a programmable logic device (PLD), an application-specific integrated circuit (ASIC), a field-programmable gate array (FPGA), a graphics processing unit (GPU), a video card controller, etc. Any of the functions and steps provided in the accompanying drawings may be implemented in hardware, software or a combination of both and may be performed in whole or in part within the programmed instructions of a computer. In addition, one of ordinary skill in the art may understand and appreciate that a processor or a microprocessor may be hardware in the present disclosure.

The memory 130 may store commands or data received from the processor 120 or other elements (e.g., the input/output interface 150, the display 160, the communication interface 170, and the like) or generated by the processor 120 or the other elements. The memory 130 may include programming modules 140, such as a kernel 141, middleware 143, an application programming interface (API) 145, an application 147, and the like. Each of the above-described programming modules may be implemented in software, firmware, hardware, or a combination of two or more thereof.

The kernel 141 may control or manage system resources (e.g., the bus 110, the processor 120, the memory 130, and the like) used to execute operations or functions implemented by other programming modules (e.g., the middleware 143, the API 145, and the application 147). In addition, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. In addition, in relation to work requests received from the application 147 and/or the middleware 143, for example, may perform load balancing of the work requests by using a method of assigning a priority, in which system resources (e.g., the bus 110, the processor 120, the memory 130, and the like) of the electronic device 101 can be used, to the application 147.

The API 145 is an interface through which the application 147 is capable of controlling a function provided by the kernel 141 or the middleware 143, and may include, for example, at least one interface or function for file control, window control, image processing, character control, and the like.

The input/output interface 150 may include various interface circuitry and, for example, may receive a command or data as input from a user, and may deliver the received command or data to the processor 120 or the memory 130 through the bus 110. The display 160 may display a video, an image, data, and the like, to the user.

The communication interface 170 may include various communication circuitry and connect communication between electronic devices 102 and 104 and the electronic device 101. The communication interface 170 may support a short-range communication protocol (e.g., wireless fidelity (Wi-Fi), Bluetooth (BT), and near field communication (NFC)), or a network communication (e.g., the internet, a local area network (LAN), a wide area network (WAN), a telecommunication network, a cellular network, a satellite network, a plain old telephone service (POTS), and the like). Each of the electronic devices 102 and 104 may be a device which is identical (e.g., is of an identical type) to or different (e.g., is of a different type) from the electronic device 101.

Further, the communication interface 170 may enable communication between a server 106 and the electronic device 101 via a network 162. Additionally, the communication interface 170 may establish a short-range wireless communication connection 164 between the electronic device 101 and any other electronic device (e.g., electronic device 102).

Figure 2:
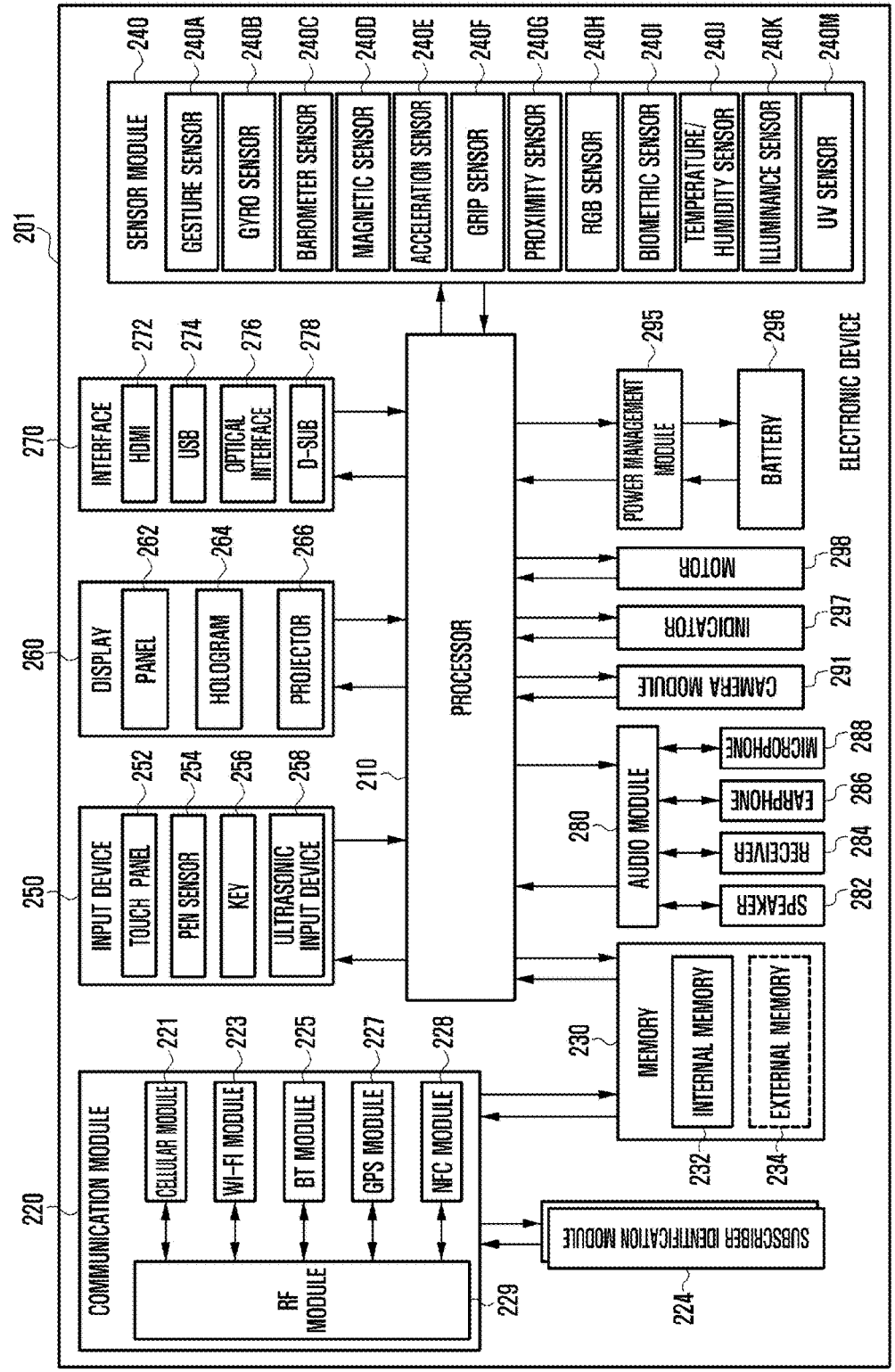
FIG. 2 illustrates a block diagram of a configuration of an electronic device according to various embodiments of the present disclosure.

FIG. 2 illustrates a block diagram of an electronic device 201 according to an embodiment of the present disclosure.

Referring to FIG. 2, the electronic device 201 may include a processor (e.g., and application processor (AP) including processing circuitry) 210, a subscriber identification module (SIM) card 224, a memory 230, a communication module (e.g., including communication circuitry) 220, a sensor module 240, an input device (e.g., including input circuitry) 250, a display 260, an interface (e.g., including interface circuitry) 270, an audio module (e.g., including a coder/decoder (codec)) 280, a camera module 291, a power management module 295, a battery 296, an indicator 297, a motor 298 and any other similar and/or suitable components.

The processor 210 may include various processing circuitry, such as, for example, and without limitation, one or more of a dedicated processor, a CPU, APs, and one or more communication processors (CPs). The processor 210 may be, for example, the processor 120 illustrated in FIG. 1. The AP and the CP may be included in the processor 210 in FIG. 2, or may be included in different integrated circuit (IC) packages, respectively. According to an embodiment of the present disclosure, the AP and the CP may be included in one IC package.

The AP may execute an operating system (OS) or an application program, and thereby may control multiple hardware or software elements connected to the AP and may perform processing of and arithmetic operations on various data including multimedia data. The AP may be implemented by, for example, a system on chip (SoC). According to an embodiment of the present disclosure, the processor 210 may further include a GPU.

The CP may manage a data line and may convert a communication protocol in the case of communication between the electronic device (e.g., the electronic device 101) including the electronic device 201 and different electronic devices connected to the electronic device through the network. The CP may be implemented by, for example, an SoC. According to an embodiment of the present disclosure, the CP may perform at least some of multimedia control functions. The CP, for example, may distinguish and authenticate a terminal in a communication network using a SIM (e.g., the SIM 224). In addition, the CP may provide a user with services, such as a voice telephony call, a video telephony call, a text message, packet data, and the like.

Further, the CP may control the transmission and reception of data by the communication module 220. In FIG. 2, the elements, such as the power management module 295, the memory 230, and the like are illustrated as elements separate from the processor 210. However, according to an embodiment of the present disclosure, the processor 210 may include at least some of the above-described elements (e.g., the power management module 295).

According to an embodiment of the present disclosure, the AP or the CP may load, to a volatile memory, a command or data received from at least one of a non-volatile memory and other elements connected to each of the AP and the CP, and may process the loaded command or data. In addition, the AP or the CP may store, in a non-volatile memory, data received from or generated by at least one of the other elements.

The SIM 224 may be a card implementing a SIM, and may be inserted into a slot formed in a particular portion of the electronic device 201. The SIM 224 may include unique identification information (e.g., IC card identifier (ICCID)) or subscriber information (e.g., international mobile subscriber identity (IMSI)).

The memory 230 may include an internal memory 232 and/or an external memory 234. The memory 230 may be, for example, the memory 130 illustrated in FIG. 1. The internal memory 232 may include, for example, at least one of a volatile memory (e.g., a dynamic random access memory (DRAM), a static RAM (SRAM), a synchronous dynamic RAM (SDRAM), and the like), and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NOT AND (NAND) flash memory, a NOT OR (NOR) flash memory, and the like). According to an embodiment of the present disclosure, the internal memory 232 may be in the form of a solid state drive (SSD). The external memory 234 may further include a flash drive, for example, a compact flash (CF) drive, a secure digital (SD) drive, a micro-SD drive, a mini-SD drive, an extreme digital (xD) drive, a memory stick, and the like.

The communication module 220 may include various communication circuitry including, for example, and without limitation, a radio frequency (RF) module 229. The communication module 220 may be, for example, the communication interface 170 illustrated in FIG. 1. The communication module 220 may further include various communication circuitry including, for example, and without limitation, wireless communication modules to enable wireless communication through the RF module 229. The wireless communication modules may include, for example, and without limitation, a cellular module 221, a Wi-Fi module 223, a BT module 225, a GPS module 227, and an NFC module 228. Additionally or alternatively, the wireless communication modules may further include a network interface (e.g., a LAN card), a modulator/demodulator (modem), and the like for connecting the electronic device 201 to a network (e.g., the internet, a LAN, a WAN, a telecommunication network, a cellular network, a satellite network, a POTS, and the like).

The communication module 220 may perform data communication with the electronic devices 102 and 104, and the server 106 through the network 162.

The RF module 229 may be used for transmission and reception of data, for example, transmission and reception of RF signals or called electronic signals. The RF unit 229 may include, for example, a transceiver, a power amplifier module (PAM), a frequency filter, a low noise amplifier (LNA), and the like. In addition, the RF module 229 may further include a component for transmitting and receiving electromagnetic waves in free space in a wireless communication, for example, a conductor, a conductive wire, and the like.

The sensor module 240 may include, for example, at least one of a gesture sensor 240A, a gyro sensor 240B, an barometer (e.g., atmospheric pressure) sensor 240C, a magnetic sensor 240D, an acceleration sensor 240E, a grip sensor 240F, a proximity sensor 240G, a red, green and blue (RGB) sensor 240H, a biometric (e.g., bio) sensor 240I, a temperature/humidity sensor 240I, an illumination (e.g., light) sensor 240K, and an ultra violet (UV) light sensor 240M. The sensor module 240 may measure a physical quantity or detect an operating state of the electronic device 201, and convert the measured or detected information into an electrical signal. Additionally/alternatively, the sensor module 240 may include, for example, an electronic nose (E-nose) sensor, an electromyography (EMG) sensor, an electroencephalogram (EEG) sensor, an electrocardiogram (ECG) sensor, a fingerprint sensor, and the like. The sensor module 240 may further include a control circuit for controlling one or more sensors included therein. The sensor module 240 may also, or in the alternative, be controlled by the processor 210.

The input device 250 may include various input circuitry, such as, for example, and without limitation, a touch panel 252, a pen sensor 254 (e.g., a digital pen sensor), a key 256, and an ultrasonic input device 258. The input device 250 may be, for example, the input/output interface 150 illustrated in FIG. 1. The touch panel 252 may recognize a touch input in at least one of, for example, a capacitive scheme, a resistive scheme, an infrared scheme, and an acoustic wave scheme. In addition, the touch panel 252 may further include a controller. In the capacitive type, the touch panel 252 is capable of recognizing a proximity touch as well as a direct touch. The touch panel 252 may further include a tactile layer. In this event, the touch panel 252 may provide a tactile response to a user.

The pen sensor 254 (e.g., a digital pen sensor), for example, may be implemented by using a method identical or similar to a method of receiving a touch input from a user, or by using a separate sheet for recognition. For example, a key pad or a touch key may be used as the key 256. The ultrasonic input device 258 enables the electronic device 201 to detect a sound wave by using a microphone 288 of the electronic device 201 through a pen generating an ultrasonic signal, and identify data. The ultrasonic input device 258 is capable of wireless recognition. According to an embodiment of the present disclosure, the electronic device 201 may receive a user input from an external device (e.g., a network, a computer, or a server), which is connected to the electronic device 201, through the communication module 220.

The display 260 may include a panel 262, a hologram 264, and a projector 266. The panel 262 may be, for example, a liquid crystal display (LCD) and an active matrix organic light emitting diode (AM-OLED) display, or the like, but is not limited thereto. The panel 262 may be implemented so as to be, for example, flexible, transparent, or wearable. The panel 262 may include the touch panel 252 and one module. The hologram 264 may display a three-dimensional image in the air by using interference of light. The projector 266 may include light-projecting elements, such as LEDs, to project light onto external surfaces. According to an embodiment of the present disclosure, the display 260 may further include a control circuit for controlling the panel 262, the hologram 264, or the projector 266.

The interface 270 may include various interface circuitry, such as, for example, and without limitation, a high-definition multimedia interface (HDMI) 272, a universal serial bus (USB) 274, an optical interface 276, and a d-subminiature (D-sub) connector 278. Additionally or alternatively, the interface 270 may include, for example, an SD/multi-media card (MMC) or an interface according to a standard of the Infrared Data Association (IrDA).

The audio module (e.g., including a codec) 280 may bidirectionally convert between an audio signal (e.g., a voice signal) and an electrical signal. The audio module 280 may convert voice information, which is input to or output from the audio module 280 through, for example, a speaker 282, a receiver 284, an earphone 286, the microphone 288, and the like.

The camera module 291 may capture a still image and a moving image. According to an embodiment of the present disclosure, the camera module 291 may include one or more image sensors (e.g., a front lens or a back lens), an image signal processor (ISP), and a flash LED.

The power management module 295 may manage power of the electronic device 201. The power management module 295 may include, for example, a power management IC (PMIC), a charger IC, or a battery gauge. The PMIC may be mounted to, for example, an IC or an SoC semiconductor. Charging methods may be classified into a wired charging method and a wireless charging method. A charger IC may charge a battery, and prevent an overvoltage or an overcurrent between a charger and the battery. According to an embodiment of the present disclosure, the charger IC may provide at least one of a wired charging method and a wireless charging method. Examples of a wireless charging method may include a magnetic resonance method, a magnetic induction method, an electromagnetic method, and the like. Additional circuits (e.g., a coil loop, a resonance circuit, a rectifier, and the like) for wireless charging may be added in order to perform wireless charging.

The battery gauge may measure, for example, a residual quantity of the battery 296, a voltage, a current or a temperature during charging. The battery 296 may supply power by generating electricity, and may be, for example, a rechargeable battery.

The indicator 297 may indicate particular states of the electronic device 201 or a part of the electronic device 201 (e.g., the AP), for example, a booting state, a message state, a charging state and the like. The motor 298 may convert an electrical signal into a mechanical vibration.

The electronic device 201 may include a processing unit (e.g., a GPU) for supporting a module TV. The processing unit for supporting a module TV may process media data according to standards, such as, for example, digital multimedia broadcasting (DMB), digital video broadcasting (DVB), MediaFlow®, and the like.

Each of the above-described elements of the electronic device 201 according to an embodiment of the present disclosure may include one or more components, and the names of the elements may change depending on the type of the electronic device 201. The electronic device 201 may include at least one of the above-described elements. Some of the above-described elements may be omitted from the electronic device 201, or the electronic device 201 may further include additional elements. In addition, some of the elements of the electronic device 201 may be combined into one entity, which may perform functions identical to those of the relevant elements before the combination.

The term "module" used in the present disclosure may refer to, for example, a unit including one or more combinations of hardware, software, and firmware. The term "module" may be interchangeably used with the terms "unit," "logic," "logical block," "component," "circuit," and the like. The term "module" may indicate a minimum unit of a component formed as one body or a part thereof. The term "module" may indicate a minimum unit for performing one or more functions or a part thereof. The term "module" may indicate a unit that is implemented mechanically or electronically. For example, and without limitation, the term "module" according to an embodiment of the present disclosure may refer to a unit that includes at least one of a dedicated processor, a CPU, an ASIC, an FPGA, and a programmable-logic device for performing certain operations which are known or will be developed in the future.

Figure 3:
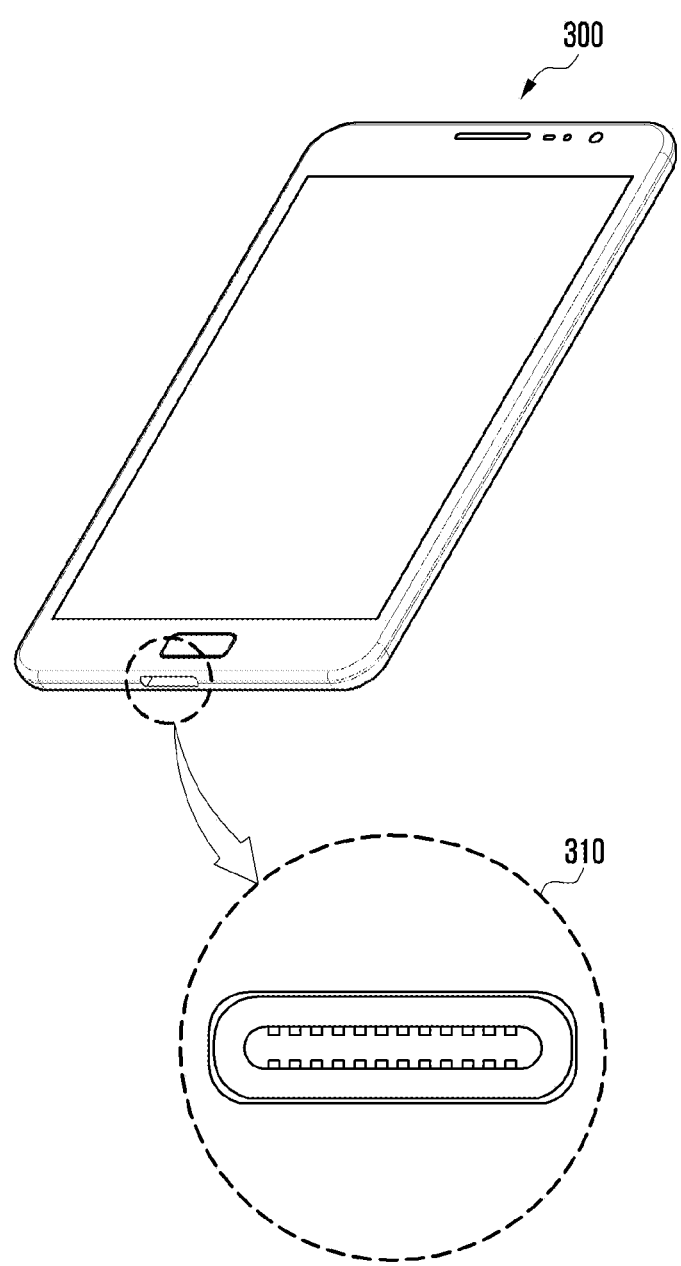
FIGS. 3 and 4A illustrate a connector for connecting an electronic device and an external electronic device according to various embodiments of the present disclosure.
Figure 4A:
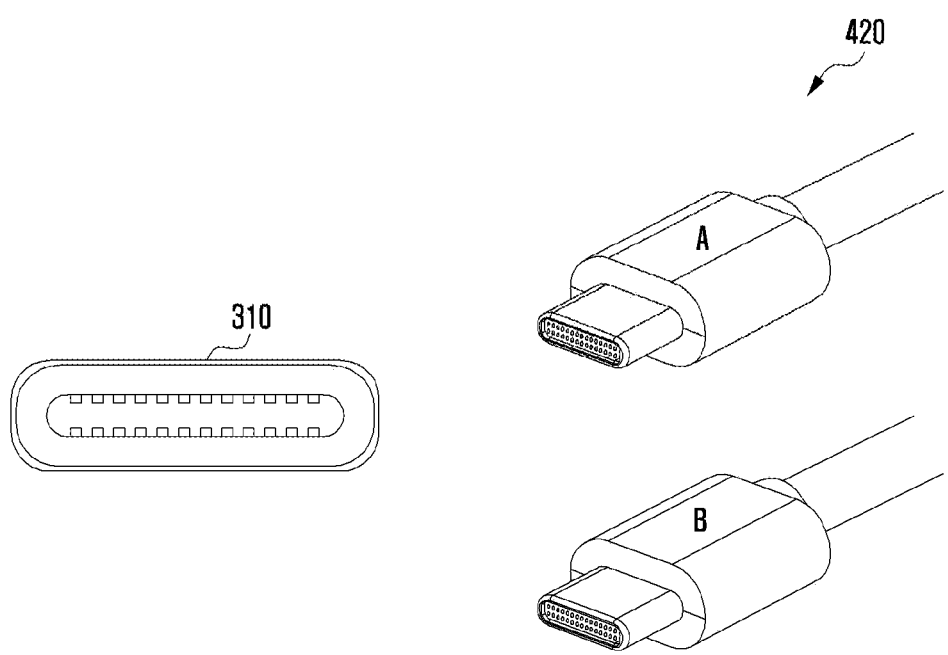

FIGS. 3 and 4A illustrate a connector for connecting an electronic device and an external electronic device according to various embodiments of the present disclosure.

According to various embodiments, the electronic device 300 may include portable electronic devices such as a smartphone and a tablet PC. However, the electronic device 300 according to the present disclosure may further include any electronic device having a connector (e.g., reference number 310) for connecting an external electronic device, such that any electronic device can transmit and receive data (e.g., multimedia data such as an audio and a control command) to/from an external electronic device connected through the connector.

According to an embodiment, the electronic device 300 may include the whole or partial components of the electronic device 101 of FIG. 1 or the electronic device 201 of FIG. 2.

According to various embodiments, the electronic device 300 may include an opening formed at a side of a housing and a hole extended to the opening and a connector 310 may be disposed in the hole. As shown in FIG. 3, the opening and hole may be formed at a bottom side of the housing of the electronic device 300, and the connector 310 may be disposed in the opening and hole. However, the location of disposing the connector 310 is not limited to this example, and the connector 310 may be disposed at another side of the housing of the electronic device 300.

A connector 420 of an external electronic device can be inserted into the connector 310 of the electronic device 300. The type of external electronic device is not limited, and all the devices such as a battery pack supplying a power to the electronic device 300, device for communicating with the electronic device 300, or external memory connected to the electronic device 300 may correspond to the external electronic device.

The connector 420 of the external electronic device can electrically connect to the connector 310 of the electronic device 300 by physically contacting the connector 310 through the hole. According to various embodiments, the connector 310 and hole of the electronic device 300 may have a reversible structure. Namely, the connector 310 may be formed symmetrically based on a first direction perpendicular to an inserting direction of the external electronic device (e.g., direction from a lower side to an upper side of the electronic device 300) and a second direction opposite to the first direction.

With reference to FIG. 4, one side (e.g., surface A) of the connector 420 of the external electronic device can be inserted into the connector 310 of the electronic device 300 in a direction parallel to the front side of the electronic device 300 (e.g., surface where a display is located). Similarly, another side (e.g., surface B) of the connector 420 of the external device can be inserted in a direction parallel to the front side of the electronic device 300.

The connector 310 may include a plurality of terminals, and if the connector 420 of the external device is inserted in a different direction, each terminal of the external electronic device connected to each terminal of the connector 310 of the electronic device 300 may differ.

According to various embodiments, the connector 310 may be a connector following a universal serial bus (hereinafter, USB) standard and, in more detail, may be a connector following a USB Type-C standard. However, various embodiments of the present disclosure are not limited to the USB Type-C and can be applied to a wired interface following various standards such as a high definition multimedia interface (HDMI), recommended standard 232 (RS-232), power line communication, or plain old telephone service (POTS), or applied to a non-standard wired interface. Further, various embodiments of the present disclosure can be applied to any interface transmitting data (e.g., data transmitted from CC1 and CC2 pins included in the USB Type-C standard), which can be used for automatically detecting a device connected between a source (device providing a power) and a sink (device receiving a power) or between a downstream facing port (DFP; data providing device) and an upstream facing port (UFP; data receiving device).

Figure 4B:
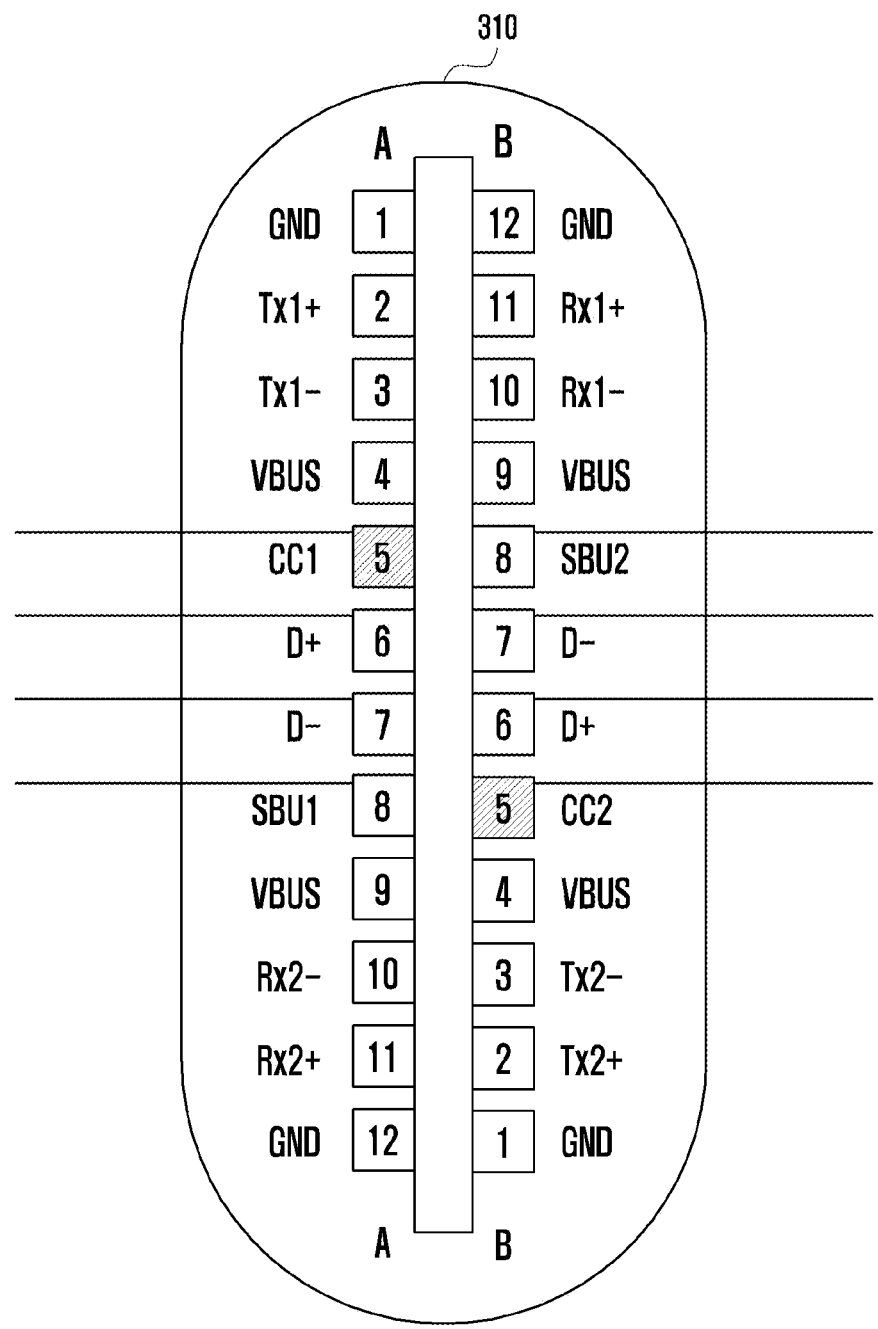
FIG. 4B illustrates a connector pin structure of an electronic device according to various embodiments of the present disclosure.

FIG. 4B illustrates a connector pin structure of an electronic device according to various embodiments of the present disclosure.

According to various embodiments, a connector of the electronic device (e.g., electronic device 300) may follow the USB Type-C standard, and FIG. 4B illustrates a plurality of terminals equipped in the connector in case that the connector of the electronic device follows the USB Type-C standard. As shown in FIG. 4B, the connector of the USB Type-C standard may have a symmetrical form by including 12 terminals at each of a left line A and a right line B.

Data signals can be transmitted through terminals A6/B6 and A7/B7. The electronic device and an external electronic device can transmit data to each other through the terminals A6/B6 (D+/D−).

Functions of each terminal in various operating modes are defined by the USB Type-C standard; therefore, a detailed description will be omitted here.

If the electronic device 300 is connected to an external electronic device, electric signals (e.g., digital ID or resistance ID) are exchanged through terminals CC1 and CC2, and the electronic device and the external electronic device can detect a type of a connected device. Further, according to the result of detecting the connected device, the electronic device can operate in a DFP mode or in a UFP mode. The DFP mode may mean a mode for providing data, and the UFP mode may mean a mode for receiving data.

The electronic device according to various embodiments of the present disclosure can transmit and receive data to/from an external electronic device connected through terminals CC1 or CC2 of the USB Type-C connector. The CC pin may be used for automatically detecting devices connected between a source (device providing a power) and a sink (device receiving a power) or between a DFP (device providing data) and a UFP (device receiving data).

A message and a structure of the message including data transmitted and received through the CC pin will be described with reference to FIGS. 5 and 6.

When exchanging data with the external electronic device through the CC pin, the electronic device 300 can transmit and receive a Power Delivery (PD) message using a bi-phase mark coding (BMC) communication standard. The BMC communication standard defines a method for transmitting a signal in a physical class, and a detailed description will be omitted here because the BMC communication standard is well known to those skilled in the art. FIG. 5 illustrates the standard of a PD message used for transmitting the PD message through a CC pin in an electronic device according to various embodiments of the present disclosure. With reference to FIG. 5, the PD message may be configured sequentially with a preamble 510, start of packet (SOP) 520, message header 530, data objects 540, cyclic redundancy check (CRC) 550, and end of packet (EOP) 560.

The preamble 510 may mean data used for synchronizing a timing of data transmission between the electronic device 300 and an external electronic device.

The SOP 520 may mean data indicating the start of a packet.

Figure 5:
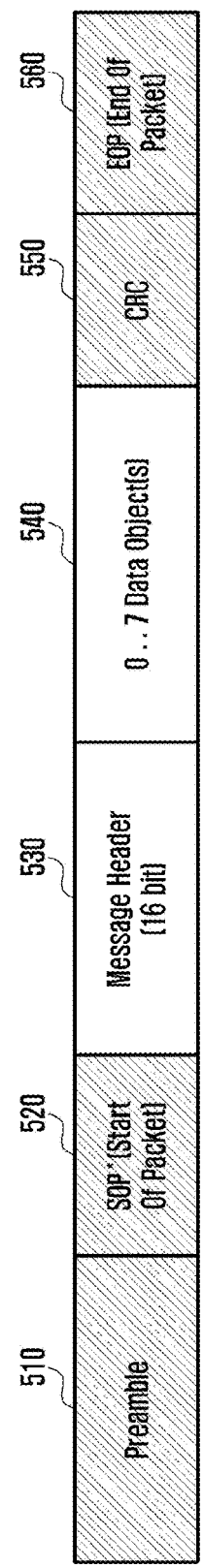
FIG. 5 illustrates a message standard transmitted when transmitting data by using a CC pin in an electronic device according to various embodiments of the present disclosure.

The message header 530 may mean data indicating the whole information of the PD message shown in FIG. 5. The message header 530 may be configured with a total of 16 bits, and the message header 530 may have a structure as shown in Table 1 according to an embodiment of the present disclosure.

TABLE 1

| Bit order | Field name |
| --- | --- |
| 15 | Reserved |
| 14-12 | Number of data objects |
| 11-9 | Message identifier |
| 8 | Source or Sink |
| 7-6 | Specification Revision |
| 5 | Data role (DFP or UFP) |
| 4 | Reserved |
| 3-0 | Message type |

With reference to Table 1, the PD message transmitted and received through a CC pin in an electronic device according to various embodiments of the present disclosure may include data related to the number of data objects, role of an electronic device in a power supply (whether power is supplied to an external electronic device or received from the external electronic device), specification version of the power delivery in the electronic device, and role of the electronic device in handling data (whether the data is transmitted to the external electronic device or received from the external electronic device).

The data object 540 may mean a field including data of the PD message. According to various embodiments of the present disclosure, the data object 540 may include authentication information or control information of the external electronic device connected to the electronic device.

The CRC 550 may mean a field including a value for identifying whether an error is included in the PD message. The EOP 560 may mean a field indicating the end of the PD message.

With reference to Table 1, a message type is defined by a lower bit 3-0 of the message header 530. Details of the message type is listed in Table 2.

TABLE 2

| Bits 3/2/1/0 | Message type |
| --- | --- |
| 0000 | Reserved |
| 0001 | Source capabilities message type |
| 0010 | Request |
| 0011 | BIST |
| 0100 | Sink capabilities message type |
| 0101~1110 | Reserved |
| 1111 | VDM type |

According to various embodiments of the present disclosure, the electronic device and the external electronic device can transmit a VDM to each other. The VDM may mean a PD message having a message type defined by the message header 530 of FIG. 5. A structure of the VDM is defined by the power delivery specification of USB Type-C, and the structure of the VDM will be described with reference to FIG. 6.

Figure 6:
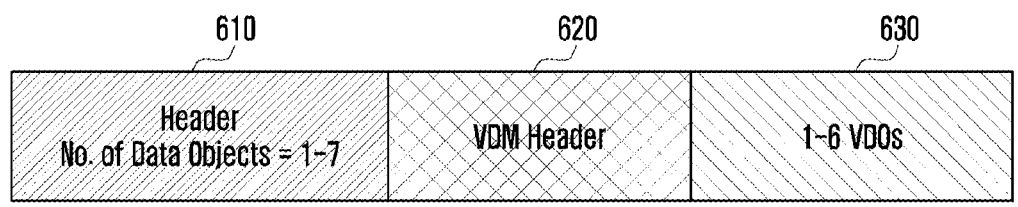
FIG. 6 illustrates a vendor defined message (VDM) standard transmitted by using a CC pin in an electronic device according to various embodiments of the present disclosure.

FIG. 6 illustrates a VDM standard transmitted by using a CC pin in an electronic device according to various embodiments of the present disclosure. With reference to FIG. 6, the VDM may be configured with a header 610, VDM header 620, and Vendor Defined Data Objects (VDOs) 630.

The header 610 may be the same as the message header 530 of FIG. 5.

The VDM header 620 and the VDOs 630 may be data included in the fields of the data objects of FIG. 5. The VDOs 630 may mean fields allocated for data included in the VDM. According to various embodiments of the present disclosure, authentication information or control information of an external electronic device connected to an electronic device may be included in the VDOs 630.

According to various embodiments of the present disclosure, the VDM header 620 may be defined as in the following Table 3.

TABLE 3

| Bits | Parameter | Description |
| --- | --- | --- |
| 31 ... 16 | Vendor identifier | Unique identifier of a manufacturer that produced a VDM message generating device |
| 15 | VDM type | 1: Structured VDM<br>0: Unstructured VDM |
| 14 ... 0 | data | Includes data defined by a vendor. |

With reference to FIG. 3, the VDM may be divided into a structured VDM and an unstructured VDM. The structured VDM may mean a message related to an alternative mode defined by a power delivery specification of the USB Type-C. The structured VDM may be configured with an identity search, Standard Vendor Identification (SVID) search, mode search, mode entrance, mode exit, and warning message. The unstructured VDM is not separately defined by the power delivery specification of the USB Type-C, and the unstructured VDM can be used as a means for message transmission defined by a vendor. The unstructured VDM is not separately defined by the specification, but the unstructured VDM is limited to a maximum of 24 bytes. In case of performing data transmission through a CC included in a connector of an electronic device by using a VDM message having a limited size, a large amount of data cannot be transmitted because of the size limitation. Each of the VDOs illustrated in FIG. 6 is defined to occupy 4 bytes. Further, each VDM may include 6 VDOs. Accordingly, in case of transmitting and receiving data by using a VDM, data having a maximum size of 24 bytes can be transmitted and received.

Further, a VDM header can include an identifier of a vendor as shown by the VDM header of Table 3; however, an identifier of each product is not included in the VDM header in case of products made by an identical vendor or manufacturer. Accordingly, in case that a vendor supplies more than one type of product, each of the products cannot be recognized individually.

The electronic device according to various embodiments can transmit data having a large size or encrypted authentication data by adding a new field into the VDM.

The electronic device according to various embodiments can distinguish products included in an external electronic device through a VDM message in case that a plurality of products is installed in the external electronic device.

Detailed embodiments of adding a new field in the VDM and detailed embodiments of an electronic device using the new field will be described hereinafter.

Figure 7:
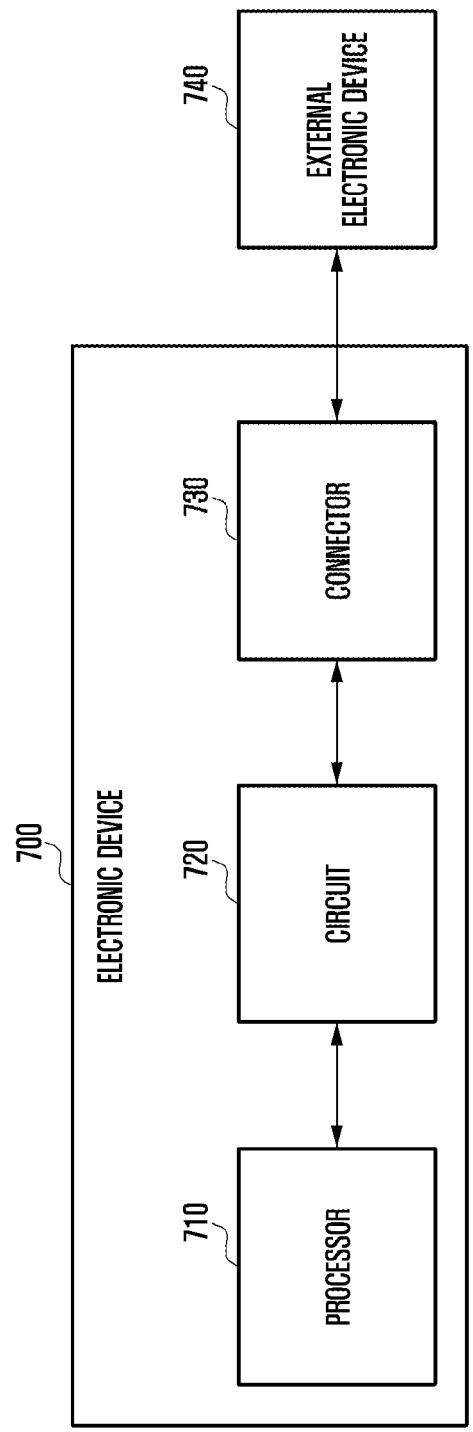
FIG. 7 illustrates a block diagram of a configuration of an electronic device according to various embodiments of the present disclosure.

FIG. 7 illustrates a block diagram of a configuration of an electronic device according to various embodiments of the present disclosure.

With reference to FIG. 7, the electronic device 700 according to various embodiments of the present disclosure may be configured with a processor 710, circuit 720, and connector 730.

The connector 730 is a connector supporting Universal Serial Bus (USB) Type C and may include a CC pin. Detailed descriptions about the connector 730 have been made already in relation to FIG. 4B.

The circuit 720 may mean a circuit electrically connected to the connector 730. According to various embodiments of the present disclosure, the circuit 720 may be also connected to the processor 710. According to various embodiments of the present disclosure, the circuit 720 can control to transmit and receive a PD message to/from the external electronic device 740 connected through the CC pin. For this, the circuit 720 may include a CC logic (and/or PD logic). For example, if the PD message is received from the external electronic device 740, the circuit 720 can transmit the received PD message to the processor 710 by using a separate I2C communication channel.

The processor 710 can perform various functions by using the PD message transmitted from the external electronic device 740. According to various embodiments of the present disclosure, the processor 710 can perform authentication of the external electronic device 740 by using the PD message transmitted from the external electronic device 740. According to various embodiments of the present disclosure, if at least one VDM message is received from the external electronic device, the processor 710 can transmit a response message to the external electronic device 740. The structure of the response message will be described with reference to FIGS. 8B and 9B.

In order to transmit data to the external electronic device 740, the processor 710 can control the circuit 720 to transmit a PD message including data to the external electronic device 740. According to various embodiments of the present disclosure, the processor 410 can transmit the data to the external electronic device 740 by using a VDM as one of message types from the PD message.

According to various embodiments of the present disclosure, the processor 710 can transmit data to the external electronic device by using a single VDM or a plurality of VDMs.

For example, if the size of data to be transmitted is smaller than a predetermined size (e.g., 24 bytes), the processor 710 can transmit the data to the external electronic device 740 by using a single VDM. The structure of the VDM will be described with reference to FIGS. 8A and 8B.

For example, if the size of data to be transmitted is greater than the predetermined size (e.g., 24 bytes) the processor 710 can transmit data to the external electronic device 740 by using a plurality of VDMs. According to various embodiments of the present disclosure, the processor 710 can determine the number of VDMs according to the size of data, and the processor 710 can transmit the data by using a plurality of VDMs. By transmitting VDMs including divided data to the external electronic device 740, the processor 710 can transmit data having a large capacity to the external electronic device 740 through a CC pin.

According to various embodiments, the processor 710 and the circuit 720 may be configured with a single processor and a single circuit. Further, the processor 710 may be included in one of a communication module (e.g., communication module 220) or a communication interface (e.g., communication interface 170). According to various embodiments, in case of an external electronic device 740 having a USB Type-C interface and supporting a PD function, the external electronic device 740 can communicate with the electronic device 700 through the CC pin without adding a separate circuit or module.

A VDM structure usable for transmitting large capacity data will be described with reference to FIGS. 9A to 9C. A method for transmitting a plurality of VDMs in order to transmit large capacity data through a CC pin between the electronic device 700 and the external electronic device 740 will be described in the following FIGS. 9A to 9C. In particular, a data structure is defined in order to transmit a plurality of VDMs. Before describing a method for transmitting a plurality of VDMs, a VDM structure for transmitting a VDM having a small size will be described.

Figure 8A:
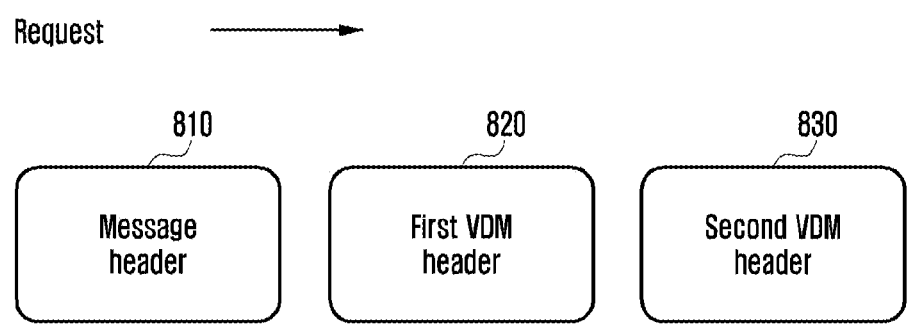
FIGS. 8A and 8B illustrate an example of transmitting data having a small size when transmitting a VDM in an electronic device according to various embodiments of the present disclosure.
Figure 8B:
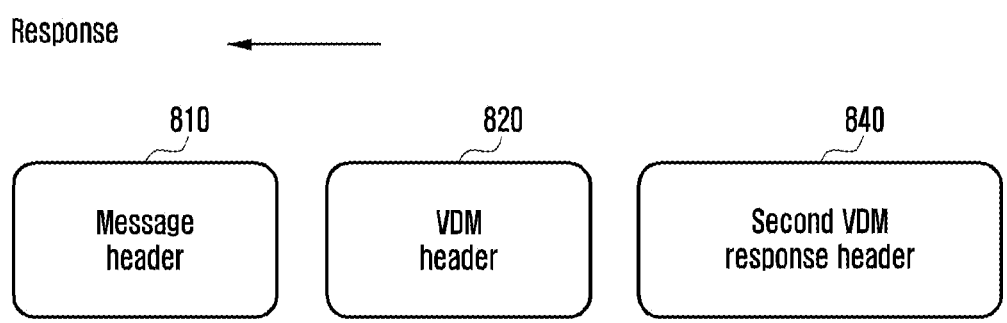

FIG. 8A illustrates a structure of a VDM for transmitting data by using a single VDM. FIG. 8B illustrates a structure of a response message transmitted after receiving the VDM shown in FIG. 8A. As described in FIG. 7, data having a small size may mean data having a size smaller than a predetermined size. For example, data having a size smaller than the maximum of 24 bytes includable in one VDM may be called data having a small size.

With reference to FIG. 8A, the VDM may include a message header 810, first VDM header 820, and second VDM header 830. The message header 810 may mean a header including the same data as the message header 530 of FIG. 5 and the header 610 of FIG. 6.

The first VDM header 820 may mean the same data as the VDM header 620 of FIG. 6.

According to an embodiment, the VDM transmitted and received between the electronic device 700 and the external electronic device 740 may further include a second VDM header 830 in the VDO data fields 540 and 630.

According to various embodiments, the second VDM header 830 may include a product identifier (PID) of a connected product.

According to various embodiments, the second VDM header 830 may include an indicator for a message type classified according to a data size. For example, if the data size is smaller than a predetermined size, the second VDM header 830 may include an indicator having a value of 0. Alternatively, if the data size is greater than or equal to the predetermined size, the second VDM header 830 may include an indicator having a value of 1.

According to various embodiments, the electronic device 700 (e.g., processor 710 or circuit 720) can determine the indicator for a message type based on the type (vendor and product) of the external electronic device 740, function supported by the external electronic device 740, type of data to be transmitted or received (e.g., control data or authentication data), and/or size of data to be transmitted or received.

According to various embodiments, the processor 710 can identify a data type included in the VDM header 820 of a VDM received from the external electronic device. The processor 710 can extract data included in the VDM based on the identified data type. For example, the processor 710 can identify a value of a VDM type included in the VDM header 820 from a value of unstructured VDM type (e.g., 0). Accordingly, the processor 710 can obtain more data included in the second VDM header 830.

According to various embodiments, the processor 710 can identify a data type from data included in the second VDM header 830 of the VDM received from the external electronic device. After receiving the VDM, if the data type of the VDM header 830 is long data (e.g., 1), the processor 710 can receive a plurality of VDMs additionally (e.g., as much as the number of VDMs of the second VDM header 830).

The processor 710 can combine data obtained from each of the plurality of VDMs. The combined data may be same as the data transmitted from the external electronic device.

According to various embodiments, the second VDM header 830 may include information related to a command type included in the VDM. According to various embodiments of the present disclosure, the command type may be divided into 4 types. The command type may include an initialization command (INITIATOR), acknowledge response (RESPONSE ACK), negative acknowledgement response (RESPONSE NAK), and in-use (BUSY) state. The 4 types are frequently used in the field of communication technology; therefore, a detailed description will be omitted here.

Further, the second VDM header 830 may also include information related to the number of VDMs to be transmitted. The following Table 4 shows a message structure of the second VDM header 830.

TABLE 4

| Bits | Field | Value |
| --- | --- | --- |
| 31 . . . 16 | Vendor identifier (PID) | PID of connected device |
| 15 | Data type | 0: short data |
|  |  | 1: long data |
| 14 . . . 13 | Command type | 00b: INITIATOR |
|  |  | 01b: RESPONDER ACK |
|  |  | 10b: RESPONDER NAK |
|  |  | 11b: RESPONDER BUSY |
| 12 | Reserved |  |
| 11 . . . 8 | Number of VDMs (0~15) | 0000b . . . 1111b |
| 7 . . . 0 | Data | Value of data |

According to various embodiments with reference to Table 4, the product identifier (PID) may mean an identifier of a connected external electronic device. The product identifiers may be set differently for each product. In case that different products are produced by an identical manufacturer, the product identifiers may be set differently from each other.

According to various embodiments, the data type included in the second VDM header 830 may be divided into short data and long data according to the size of data. The short data may mean data having a size smaller than a predetermined value. The long data may mean data having a size greater than or equal to the predetermined value. According to an embodiment, the short data may mean data transmittable by one VDM, and the long data may mean data transmittable by more than one VDM.

According to various embodiments of the present disclosure, data having a size smaller than the maximum of 24 bytes includable in a VDM may be set to short data, and data having a size exceeding 24 bytes may be set to long data. According to various embodiments, the electronic device 700 (e.g., processor 710 or circuit 720) can determine a type of a message to be transmitted to the external electronic device 740. The external electronic device 740 can determine a type of a message to be transmitted to the electronic device 700 based on the message type received from the electronic device 700.

With reference to FIG. 8B, the response message may include a message header 810, VDM header 820, and second VDM response header 840.

According to various embodiments, the second VDM response header 840 may include a product identifier (PID) of an electronic device, indicator indicating a classification according to a data size, command type, and order of a currently transmitting VDM among VDMs. The order of VDMs may be used when transmitting data by using a plurality of VDMs. Because the response message of FIG. 8B is a VDM including data having a small size, the order of a currently transmitting VDM message may correspond to 1. A message structure of the second VDM response header 840 is listed in Table 5.

TABLE 5

| Bits | Field | Value |
| --- | --- | --- |
| 31 . . . 16 | Vendor identifier (PID) | PID of connected device |
| 15 | Data type | 0: short data |
|  |  | 1: long data |
| 14 . . . 13 | Command type | 00b: INITIATOR |
|  |  | 01b: RESPONDER ACK |
|  |  | 10b: RESPONDER NAK |
|  |  | 11b: RESPONDER BUSY |
| 12 . . . 4 | Reserved |  |
| 3 . . . 0 | Current order of VDMs (Order of VDMs currently completed transmission among maximum 15 VDMs) | 0000 . . . 1111 |

Based on the description of FIGS. 8A and 8B, embodiments of transmitting data having a large size will be described with reference to FIGS. 9A to 9C.

Figure 9A:
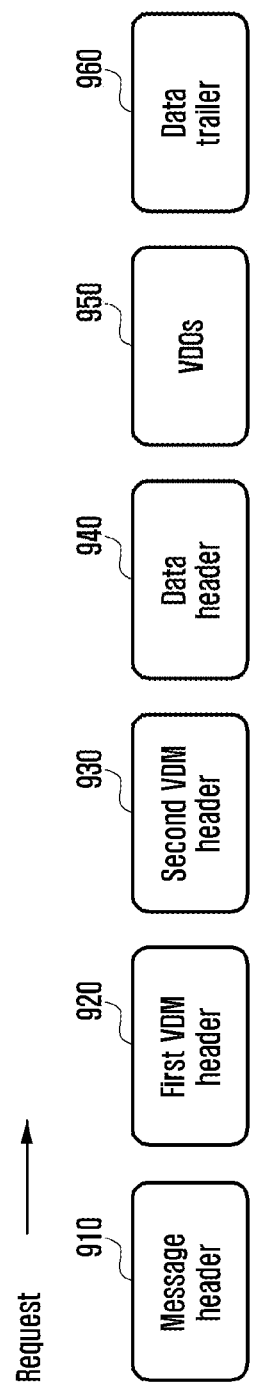
FIGS. 9A to 9C illustrate an example of transmitting data having a large size when transmitting a VDM in an electronic device according to various embodiments of the present disclosure.

FIG. 9A illustrates a structure of a VDM used for transmitting data by using a plurality of VDMs. According to an embodiment, the VDM may include a message header 910, first VDM header 920, second VDM header 930, data header 940, and VDOs 950.

As shown in FIG. 7, data having a large size may mean data having a size greater than a predetermined size. For example, data having a size greater than the maximum of 24 bytes includable in a VDM may be called data having a large size. The data having a large size cannot be transmitted and received by using one VDM, but the data can be transmitted and received by using a plurality of VDMs. Comparing FIG. 9A with FIG. 8A, in case of transmitting data by using a plurality of VDMs, the VDM shown in FIG. 9A may further include a data header 940 and VDOs 950.

According to various embodiments, the data header 940 may include information such as the order of currently transmitting VDMs, sizes of data included in VDMs, and sizes of partial data included in the current VDMs. The structure of the data header 940 is listed in the following Table 6.

TABLE 6

| Bits | Field | Value |
| --- | --- | --- |
| 31 . . . 28 | Order of VDMs currently being transmitted | 0000 . . . 1111 |
| 27 . . . 16 | Reserved |  |
| 15 . . . 8 | Size of total data (0~255 bytes) | 00000000 . . . 11111111 |
| 7 . . . 0 | Size of data included in current VDM (Max: 16 bytes or 20 bytes) | 00000000 . . . 11111111 |

According to various embodiments, the order of currently transmitting VDMs may mean the order of transmitting VDMs while transmitting the VDMs consecutively. For example, in case of transmitting 16 VDMs, an eighth VDM message may have a value of 0111 in the order of transmitting VDMs. According to an embodiment, the order of transmitting VDMs may be initialized after the last VDM in the consecutively transmitting VDMs is transmitted.

The first VDM among the currently transmitting VDMs may have a maximum data size of 16 bytes, and the following VDMs may have a maximum data size of 20 bytes. This is because the VDMs excluding the first VDM do not include a second VDM header 930 as shown in FIG. 9C. According to an embodiment, VDMs used for transmitting large capacity data may not include a second VDM header 930. However this is only one example of the VDM structure, and at least one of VDMs excluding the first VDM may also include a second VDM header 930.

According to various embodiments of the present disclosure, Vendor Defined Objects (VDOs) transmitting after a data header 940 may include a part of data.

According to various embodiments of the present disclosure, the VDM may further include an additional information field. The additional information field may include information of various data, and the VDM according to various embodiments of the present disclosure may include additional information field such as a data trailer 96. The data trailer may include checksum information of the VDM. The integrity of a VDM can be verified by using the checksum information included in the data trailer 960.

Figure 9B:
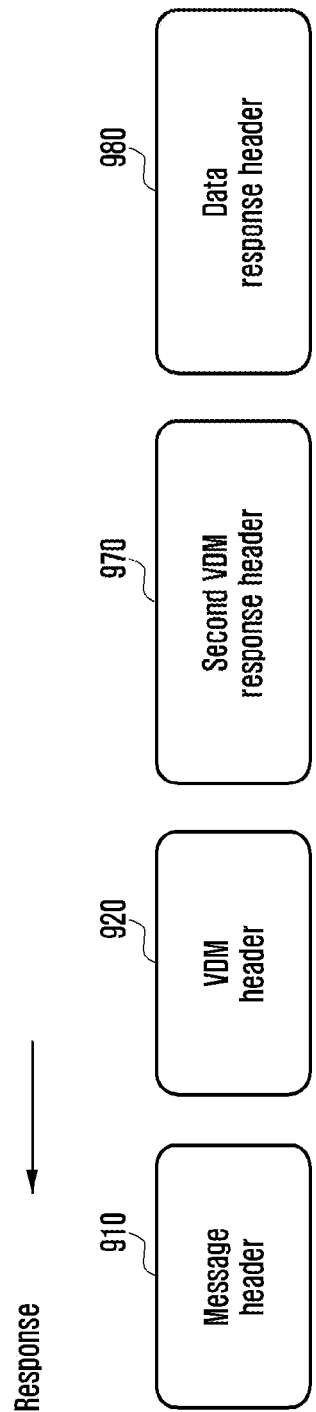
Figure 9C:
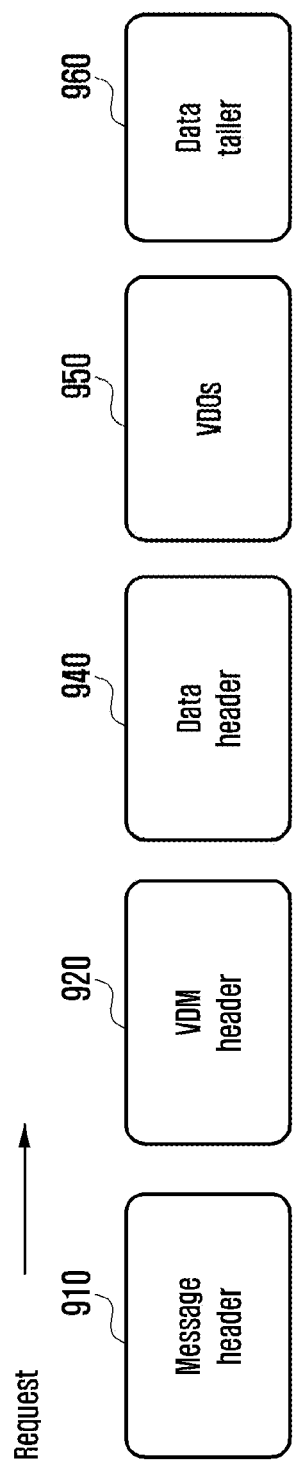

FIG. 9B illustrates a structure of a response message transmitted after receiving the VDM shown in FIG. 9A. With reference to the response message of FIG. 9B, the response message may include a message header 910, VDM header 920, second VDM response header 970, and data response header 980. A comparison with FIG. 8B shows that the data response header 980 is added to the response message of FIG. 8B.

According to various embodiments, the data response header 980 may be included in a response message of VDMs used for transmitting data having a large size. According to various embodiments of the present disclosure, the data response header 980 may not be included in a response message of a VDM used for transmitting data having a small size (data having a size smaller than a predetermined size). According to various embodiments, the data response header 980 may include a size of actually transmitted data of the current VDM and a checksum result calculated by an electronic device 700, which received the data. A message structure of the data response header 980 is listed in the following Table 7.

TABLE 7

| Bits | Field |
|---|---|
| 31 . . . 24 | Size of data included in current VDM |
| 23 . . . 16 | Reserved |
| 15 . . . 0 | Checksum |

Figure 10:
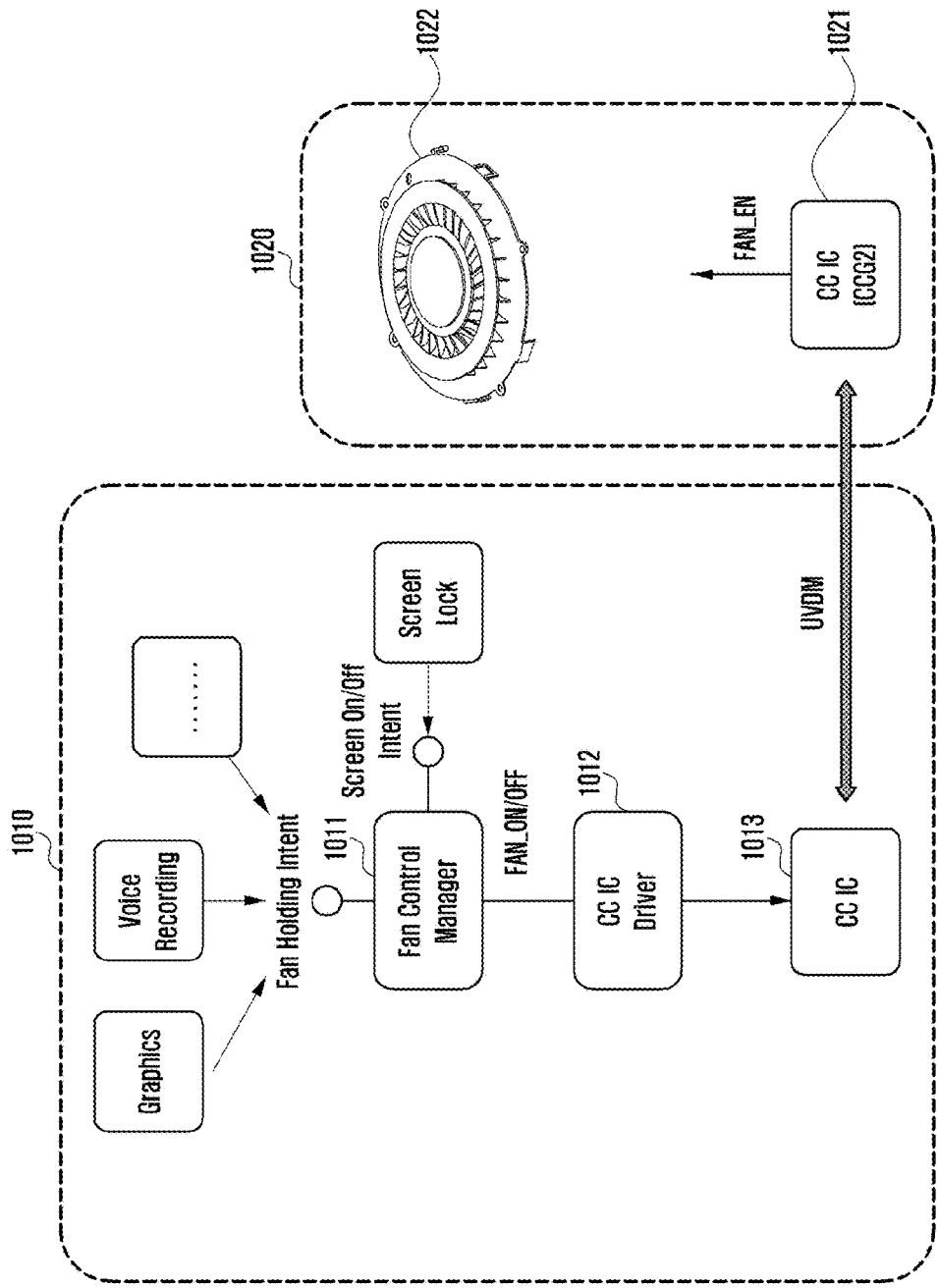
FIGS. 10 and 11 illustrate an example of controlling an external electronic device by using a VDM in an electronic device according to various embodiments of the present disclosure.
Figure 11:
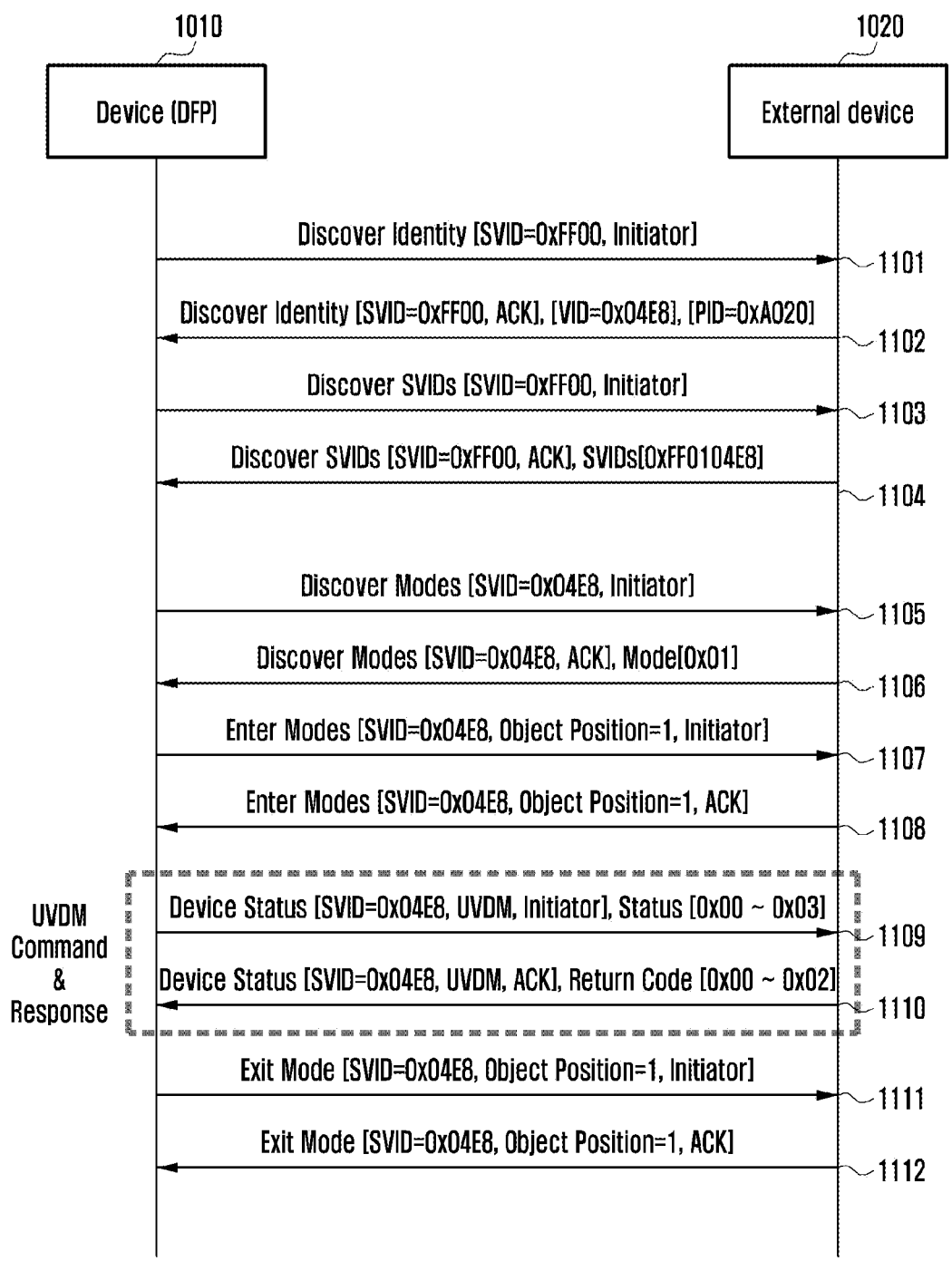

FIGS. 10 and 11 illustrate an example of controlling an external electronic device by using a VDM in an electronic device according to various embodiments of the present disclosure.

According to an embodiment, the electronic device 1010 may include the whole or partial components of the electronic device 101 of FIG. 1 or the electronic device 201 of FIG. 2.

FIGS. 10 and 11 illustrate an embodiment of controlling an external electronic device 1020 by transmitting data defined as short data from the electronic device 1010 through a CC channel. According to various embodiments of the present disclosure, data including command information for controlling a fan 1022 of the external electronic device 1020 may be defined as short data. Further, the data including command information for controlling a fan 1022 of the external electronic device 1020 can be transmitted by using a VDM.

According to various embodiments of the present disclosure, the electronic device 1010 can control an internal functional module of the external electronic device 1020 through a VDM (e.g., short data VDM) transmitted by using a CC channel. The external electronic device may not include a separate data communication module (e.g., USB or UART) in order to transmit a control message of the internal functional module. According to an embodiment, the electronic device 1010 can identify a type of the external electronic device 1020 and transmit a control message if a control of the external electronic device 1020 is possible.

With reference to FIG. 10, the electronic device 1010 can identify by using a CC whether the external electronic device 1020 is connected. The external electronic device 1020 includes a fan 1022, and the external electronic device 1020 can determine an operation of the fan 1022 and a speed of the fan 1022 based on a temperature of the electronic device 1010 and a VDM (e.g., short data VDM) transmitted from the electronic device 1010.

The electronic device 1010 (e.g., processor 710) may include a fan control manager 1011 and an integrated circuit driver 1012 in a framework class, and the framework class may include a Configuration Channel (CC) integrated circuit 1013. The integrated circuit driver 1012 is used for controlling the circuit 720 of FIG. 7 or the CC integrated circuit 1013. The CC integrated circuit 1013 can be included in the circuit 720 of FIG. 7. The CC integrated circuit driver 1012 can perform a connection to a CC integrated circuit 1021 included in the external electronic device 1020 through the CC integrated circuit 1013, and the CC integrated circuit driver 1012 can control transmission and reception of a VDM.

According to various embodiments, the CC integrated circuit driver 1012 can be installed in the CC integrated circuit 1013.

Data used for controlling the fan 1022 may be smaller than 24 bytes, and the electronic device 1010 or the external electronic device 1020 can control the fan 1022 by using a request message (e.g., message shown in FIG. 8A) and a response message (e.g., message shown in FIG. 8B) through a VDM described in FIGS. 8A and 8B.

FIG. 11 illustrates a detailed embodiment of performing a connection between an electronic device 1010 and an external electronic device 1020 and a control of a fan 1022 included in the external electronic device 1020.

With reference to FIG. 11, at operation 1101, the electronic device 1010 transmits a discover identity message to the external electronic device 1020.

At operation 1102, the external electronic device 1020 transmits a response message including a manufacturer identifier (VID) of the external electronic device 1020 and a product identifier (PID) to the electronic device 1010, in response to the discover identity message.

At operation 1103, the electronic device 1010 receives the VID and the PID and transmits a message requesting for a Standard or Vendor ID (SVID) to the external electronic device 1020.

At operation 1104, the external electronic device 1020 transmits an SVID included in the external electronic device 1020 to the electronic device 1010 in response to the message requesting for an SVID. According to various embodiments of the present disclosure, the SVID may mean an identifier supported by the external electronic device 1020. For example, if the external electronic device 1020 supports a display mode and an alternative mode (or accessory mode), the external electronic device 1020 may have two SVIDs such as SVID1=OxFFO1 (display mode) and SVID2=Ox04E8 (accessory mode). The electronic device 1010 can identify the SVID transmitted by the external electronic device 1020 and know that the external electronic device supports the two modes (display mode and accessory mode).

At operation 1105, the electronic device 1010 transmits a VDM used for identifying an executable mode to the external electronic device 1020 in order to enter the accessory mode (SVID=0x04E8).

At operation 1106, the external electronic device 1020 transmits to the electronic device 1010 a response message indicating that the specific mode 0x01 is available.

At operation 1107, the electronic device 1010 transmits a VDM including a command for entering the specific mode OxOlto the external electronic device 1020 and, at operation 1108, the external electronic device enters the specific mode corresponding to the VDM received from the electronic device 1010.

According to an embodiment, the electronic device 1010 can provide a service for utilizing the external electronic device 1020 (service corresponding to the specific mode). The service may be configured with software (SW) and hardware (HW). For example, if the electronic device 1010 determines to enter a display port mode (SVID=0xFF01) through the operations 1101 to 1108, the electronic device 1010 can activate a display port service (e.g., DisplayPort SW and HW) in the electronic device 1010.

For example, if the electronic device 1010 determines to enter an accessory mode of a specific vendor (e.g., Samsung accessory mode, SVID=Ox04E8) through the operations 1101 to 1108, the electronic device 1010 can activate an accessory service (e.g., fan control function of Samsung accessory) in the electronic device 1010.

According to an embodiment, the service may include a function of controlling the external electronic device through the CC channel and the VDM.

According to various embodiments, the electronic device 1010 can determine an operation of a fan included in the external electronic device 1020 based on the temperature of the electronic device 1010. For example, the fan can operate in four modes (e.g., non-operating mode, first intensity mode, second intensity mode, and third intensity mode), and the electronic device 1010 can transmit to the external electronic device 1020 a VDM including a message indicating in which mode the fan operates Namely, data to be transmitted by the electronic device 1010 has a size less than or equal to a predetermined size (e.g., 24 bytes) and can be transmitted by using a single VDM. At operation 1109, the electronic device 1010 transmits a VDM including data for directing the external electronic device 1020 to operate the fan. At operation 1110, the external electronic device 1020 controls the fan by using the received VDM and transmits information of a fan state to the electronic device 1010.

At operation 1111, the electronic device 1010 transmits a message directing to stop the fan operation to the external electronic device 1020 and, at operation 1112, the external electronic device 1020 terminates the fan operation mode according to the message received from the electronic device 1010.

Figure 12:
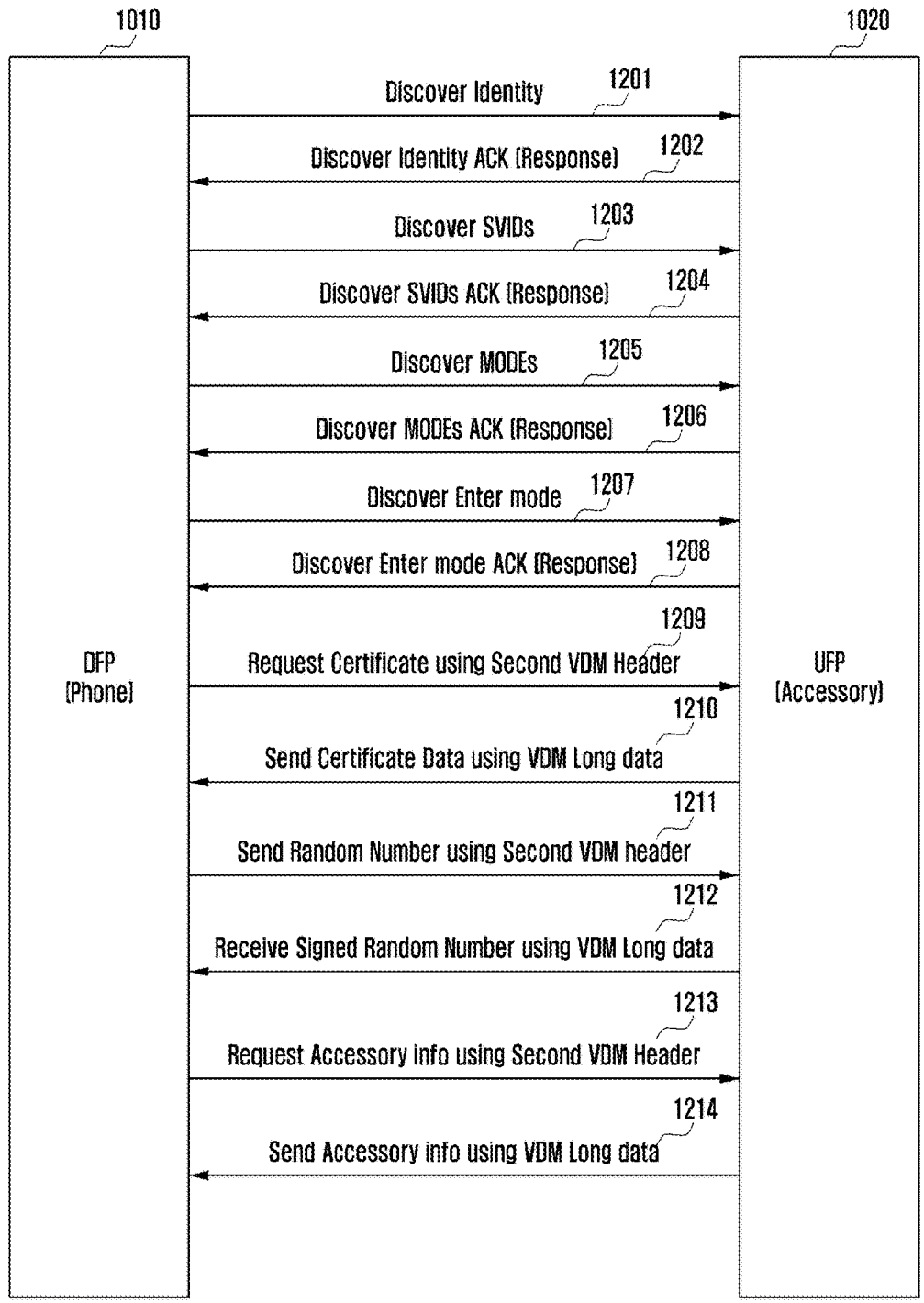
FIGS. 12 and 13 illustrate an example of performing authentication of an external electronic device by using a VDM in an electronic device according to various embodiments of the present disclosure.

FIG. 12 illustrates an embodiment of authenticating an external electronic device by an electronic device.

FIG. 12 illustrates an embodiment of controlling an external electronic device 1020 (e.g., accessory) by transmitting long data to the electronic device 1010 through a CC channel. According to various embodiments of the present disclosure, data including authentication information of the external electronic device 1020 or encrypted data of the authentication information may be defined as long data. Further, the data including authentication information or the encrypted data of the authentication information can be transmitted to the external electronic device 1020 by using a plurality of VDMs.

With reference to FIG. 12, at operation 1201, the electronic device 1010 transmits a discover identity message to the external electronic device 1020.

At operation 1202, the external electronic device 1020 transmits a response message including a manufacturer identifier (VID) of the external electronic device 1020 and a product identifier (PID) to the electronic device 1010, in response to the discover identity message.

At operation 1203, the electronic device 1010 receives the VID and the PID and transmits a message requesting for an SVID to the external electronic device 1020.

At operation 1204, the external electronic device 1020 transmits an SVID included in the external electronic device 1020 to the electronic device 1010 by responding to the message requesting for an SVID. According to various embodiments of the present disclosure, the SVID may mean an identifier supported by the external electronic device 1020.

FIG. 12 will be described by assuming that the SVID is 0x04E8. For example, if the SVID is 0x04E8, it may mean an accessory product made by a specific manufacturer.

At operation 1205, the electronic device 1010 requests the external electronic device 1020 for mode information of the received SVID. At operation 1206, the external electronic device 1020 transmits the mode information requested by the electronic device 1010.

At operation 1207, the electronic device 1010 identifies the received mode information and transmits a VDM including a command for entering a specific mode to the external electronic device 1020. At operation 1208, the external electronic device 1020 transmits a response message for the command for entering a specific mode to the electronic device 1010.

Here, the electronic device 1010 can provide a service for utilizing the external electronic device 1020 (service corresponding to a specific mode). According to an embodiment, the electronic device 1010 can perform authentication of the external electronic device 1020 and provide the service to the authenticated external electronic device. Hereinafter, a method for authenticating an external electronic device will be described.

According to an embodiment, the electronic device 1010 may include an operation of determining an additional authenticating process (not shown) according to information of the external electronic device (e.g., vid, svid, or mode) received through the operations 1201 to 1204 or through the operations 1201 to 1208. According to an embodiment, if the authentication operation is determined, the following operations 1209 to 1212 may be performed, and if the authentication operation is not determined, the following operations 1209 to 1212 may not be performed. According to an embodiment, the operation of determining the authentication operation (not shown) can be omitted.

According to various embodiments, at operation 1209, the electronic device 1010 transmits a VDM requesting for a certificate stored in the external electronic device 1020. Data requesting for a certificate may be smaller than a predetermined size. For example, the electronic device 1010 can request a certificate stored in the external electronic device 1020 by using a short type VDM shown in FIG. 8A.

According to an embodiment, at operation 1210, the external electronic device 1020 transmits data including a certificate to the electronic device 1010. The data including a certificate may be greater than a predetermined size. For example, the external electronic device 1020 can transmit the data including a certificate to the electronic device 1010 by using a long type VDM shown in FIG. 9A.

According to an embodiment, at operation 1211, the electronic device 1010 generates a random number and transmits the generated random number to the external electronic device 1020. According to various embodiments of the present disclosure, the random number can be generated with 16 bytes. Accordingly, the electronic device 1010 can transmit the random number to the external electronic device 1020 by using a short type VDM shown in FIG. 8A.

According to an embodiment, the external electronic device 1020 can encrypt the received random number. The encrypted random number can be used for authentication of the external electronic device 1020. At operation 1212, the external electronic device 1020 transmits the encrypted random number to the electronic device 1010. According to various embodiments of the present disclosure, data including the encrypted random number may be greater than a predetermined size (e.g., greater than about 40 bytes), and the data cannot be transmitted by using a VDM. Accordingly, the external electronic device 1020 can transmit the encrypted random number to the electronic device 1010 by using a long type VDM shown in FIG. 9A. According to an embodiment, the electronic device 1010 can perform authentication of the external electronic device 1020 by using the encrypted random number and the certificate. According to an embodiment, at operation 1213, the electronic device 1010 transmits a signal requesting for accessory information to the external electronic device 1020, if the authentication of the external electronic device 1020 is complete and the external electronic device 1020 is authenticated as an effective device. According to an embodiment, at operation 1214, the external electronic device 1020 transmits accessory information stored in the external electronic device 1020 to the electronic device 1010.

According to an embodiment, the accessory information may include information such as an accessory identifier, user identifier, and device identifier. According to various embodiments of the present disclosure, various functions can be provided for a user of the electronic device 1010 by using the accessory information. According to various embodiments of the present disclosure, the accessory information may have a size of about 196 bytes. Accordingly, the accessory information can be transmitted by using a long type VDM shown in FIG. 9A.

According to various embodiments, some operations can be omitted from the operations 1211 to 1214.

The VDM described in FIG. 12 may be an unstructured vendor defined message defined by a USB Type-C standard.

Figure 13:
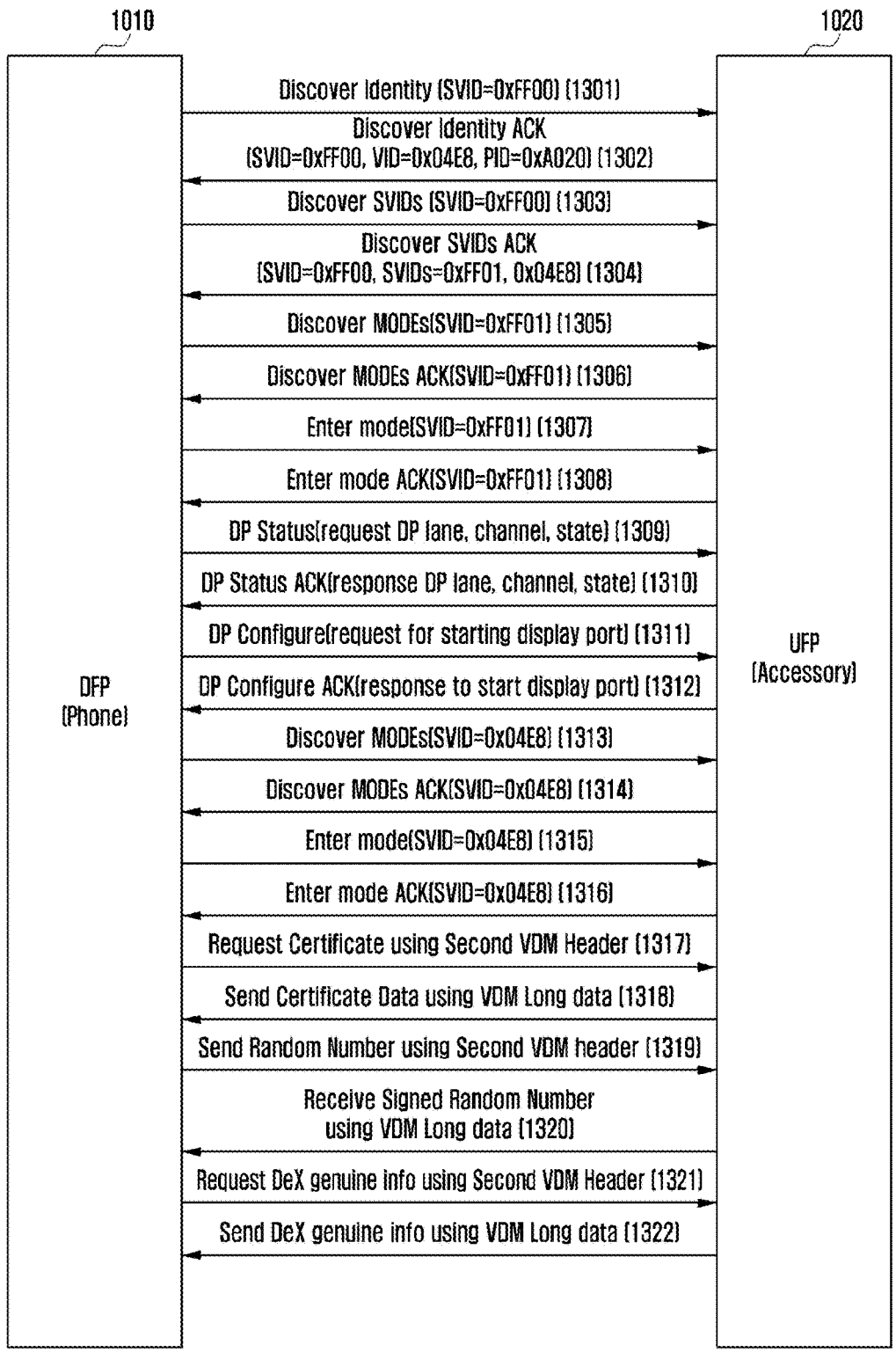

FIG. 13 illustrates an embodiment of performing authentication of an external electronic device having a plurality of SVIDs.

With reference to FIG. 13, at operation 1301, the electronic device 1010 transmits a discover identity message to the external electronic device 1020.

At operation 1302, the external electronic device 1020 transmits a response message including a Standard or Vendor ID (SVID), manufacturer identifier (VID), and product identifier (PID) of the external electronic device 1020 to the electronic device 1010, in response to the discover identity message.

At operation 1303, the electronic device 1010 receives the SVID, VID, and PID, and transmits a message requesting for an SVID to the external electronic device 1020.

At operation 1304, the external electronic device 1020 transmits an SVID included in the external electronic device 1020 to the electronic device 1010, in response to the message requesting for an SVID. According to various embodiments of the present disclosure, the SVID may mean an identifier of a mode supported by the external electronic device 1020. For example, if the external electronic device 1020 supports a display mode and an alternative mode (or accessory mode), the external electronic device 1020 may have a total of 12 SVIDs, and 2 SVIDs among the 12 SVIDs may be SVID1=0xFF01 (display mode) and SVID2=0x04E8 (accessory mode). The electronic device 1010 can identify the SVIDs (SVID1=0xFF01 (display mode) and SVID2=0x04E8 (accessory mode)) transmitted by the external electronic device 1020 and know that the external electronic device can support the two modes (display mode and accessory mode).

At operation 1305, the electronic device 1010 transmits a VDM including a signal requesting for a mode entrance to the external electronic device 1020, in order to enter the display mode (SVID=0xFF01). At operation 1306, the external electronic device 1020 transmits to the electronic device 1010 a response message indicating that a specific mode 0x01 is available.

At operation 1307, the electronic device 1010 transmits a signal requesting for a display mode state to the external electronic device 1020. At operation 1308, the external electronic device transmits the display mode state to the electronic device 1010.

After identifying the display mode state, at operation 1309 the electronic device 1010 transmits a signal requesting for the start of the display mode to the external electronic device 1020. At operation 1310, the external electronic device 1020 starts the display mode and transmits a response message to the electronic device 1010. The display mode shown in FIG. 13 may mean one of functions provided directly by the external electronic device 1020 or the electronic device 1010 without performing an authentication procedure.

At operation 1313, the electronic device 1010 transmits a signal for searching a specific mode to the external electronic device 1020. At operation 1314, the external electronic device 1020 transmits to the electronic device 1010 a response message informing whether the specific mode (e.g., accessory mode) is available. At operation 1315, the electronic device 1010 transmits a VDM including a command for entering the specific mode to the external electronic device 1020. At operation 1316, the external electronic device 1020 transmits a response message to the electronic device 1010.

Here, the electronic device 1010 can provide a service for utilizing the external electronic device 1020 (service corresponding to the specific mode). However, the electronic device 1010 performs authentication of an external electronic device 1020, and the electronic device 1010 can provide the service to the authenticated external electronic device 1020. Hereinafter, an embodiment of authenticating the external electronic device 1020 will be described.

According to an embodiment, the electronic device 1010 may include an operation of determining an additional authenticating process (not shown) according to information of the external electronic device (e.g., vid, svid, or mode) received through the operations 1301 to operation 1304 or through the operations 1301 to 1316. According to an embodiment, if the authentication operation is determined, the following operations 1317 to 1322 may be performed, and if the authentication operation is not determined, the following operations 1317 to 1322 may not be performed. According to an embodiment, the operation of determining the authentication operation (not shown) can be omitted.

At operation 1317, the electronic device 1010 transmits a VDM requesting for a certificate stored in the external electronic device 1020. Data requesting for a certificate may be smaller than a predetermined size. Accordingly, the electronic device 1010 can use a short type VDM shown in FIG. 8A.

At operation 1318, the external electronic device 1020 transmits data including a certificate to the electronic device 1010. The data including a certificate may be greater than a predetermined size. Accordingly, the external electronic device 1020 can use a long type VDM shown in FIG. 9A.

At operation 1319, the electronic device 1010 generates a random number and transmits the generated random number to the external electronic device 1020. According to various embodiments of the present disclosure, the random number can be generated with 16 bytes. Accordingly, the electronic device 1010 can transmit the random number to the external electronic device 1020 by using a short type VDM shown in FIG. 8A.

The external electronic device 1020 can encrypt the received random number. The encrypted random number can be used for authentication of the external electronic device 1020. At operation 1320, the external electronic device 1020 transmits the encrypted random number to the electronic device 1010. According to various embodiments of the present disclosure, data including the encrypted random number may be greater than a predetermined size (e.g., greater than about 40 bytes), and the data cannot be transmitted by using a single VDM. Accordingly, the external electronic device 1020 can transmit the encrypted random number to the electronic device 1010 by using a long type VDM shown in FIG. 9A.

According to an embodiment, the electronic device 1010 can perform authentication of the external electronic device 1020 by using the encrypted random number and the certificate. At operation 1321, the electronic device 1010 transmits a signal requesting for information of the external electronic device 1020 to the external electronic device 1020, if the authentication of the external electronic device 1020 is complete and the external electronic device 1020 is authenticated as an effective device. At operation 1322, the external electronic device 1020 transmits information stored in the external electronic device 1020 to the electronic device 1010.

According to various embodiments of the present disclosure, the electronic device can provide various functions for a user by using the information of the external electronic device. According to various embodiments of the present disclosure, the information of the external electronic device 1020 may have a size about 196 bytes. Accordingly, the accessory information can be transmitted by using a long type VDM shown in FIG. 9A.

The VDM described in FIG. 13 may be an unstructured vendor defined message defined by the USB Type-C standard.

An electronic device according to various embodiments of the present disclosure may comprise a housing, a USB Type-C connector 310 or 730 configured to be connected to the housing or exposed through the housing and to include at least one configuration channel (CC) pin, a circuit 720 configured to be disposed in the housing and connected electrically to the connector, and a processor 710 configured to be disposed in the housing and connected electrically to the circuit. The circuit may be configured to transmit and receive a packet through the CC pin. The packet may sequentially comprise a message header 810 or 910, a first vendor defined message (VDM) header 820 or 920, and a second VDM header 830 or 930 including a product identifier and a data type.

In the electronic device according to various embodiments of the present disclosure, the data type may comprise a first type or a second type, and a data size of the second type may be greater than a data size of the first type.

In the electronic device according to various embodiments of the present disclosure, if the data type is a first data type, the packet may further comprise data 940 and 950 related to at least one of authentication, compatibility, and a control signal of an external electronic device connected to the electronic device. The data may be included subsequent to the second VDM header 830.

In the electronic device according to various embodiments of the present disclosure, if the data type is a second type, the packet sequentially may comprise a part of a data header 940, authentication, and data related to compatibility 950 subsequent to the second VDM header 930.

In the electronic device according to various embodiments of the present disclosure, the packet may comprise a data trailer 960 subsequent to a part of the data, and the data trailer may comprise integrity information of the data.

In the electronic device according to various embodiments of the present disclosure, the second VDM header 830 may comprise a command type indicating whether the packet is in an initialization command (INITIATOR), acknowledge response (RESPONSE ACK), negative acknowledgement response (RESPONSE NAK), or in-use (BUSY) state.

The electronic device according to various embodiments of the present disclosure may be one of a mobile computing device, dock, or accessory device.

In the electronic device according to various embodiments of the present disclosure, the second VDM header 830 may comprise an indicator indicating the number of VDMs.

In the electronic device according to various embodiments of the present disclosure, the data header 940 may comprise, among VDMs included in the packet, an indicator indicating the order of VDMs having the data header, size of data included in the packet, and size of data included in a VDM having the data header.

In the electronic device according to various embodiments of the present disclosure, if the data type is a first type, the processor can combine data with the second VDM header 830.

Figure 14:
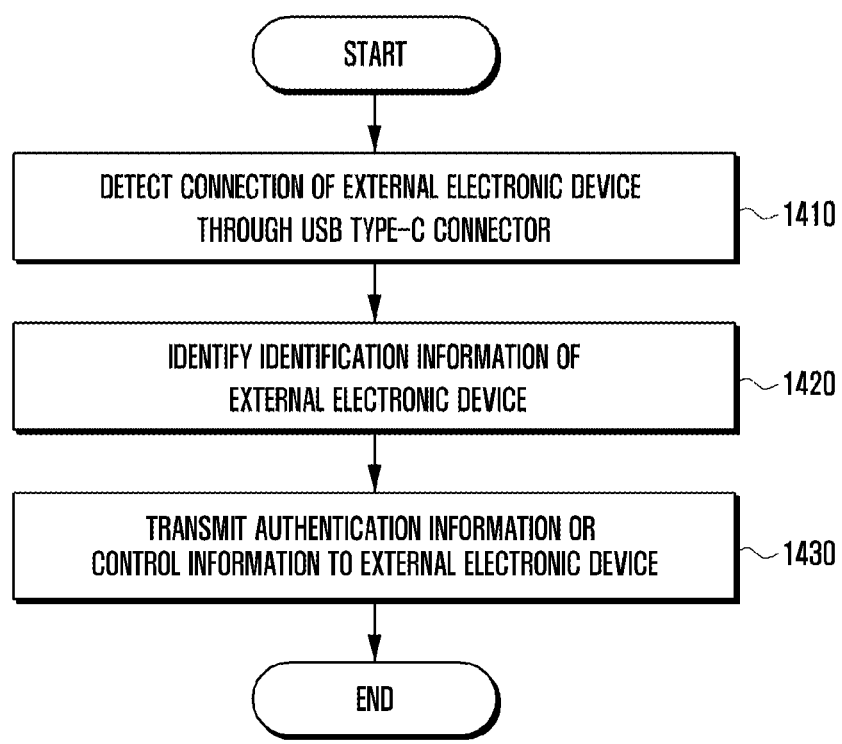
FIG. 14 illustrates a flowchart of a method for operating an electronic device according to various embodiments of the present disclosure.

FIG. 14 illustrates a flowchart of a method for operating an electronic device according to various embodiments of the present disclosure.

The electronic device according to an embodiment may include the whole or partial components of the electronic device 700 shown in FIG. 7.

With reference to FIG. 14, at operation 1410, the electronic device according to various embodiments of the present disclosure (e.g., electronic device 700 of FIG. 7) identifies whether an external electronic device (e.g., external electronic device 740 of FIG. 7) is connected. For example, the processor 710 can identify whether the external electronic device 740 is connected to the USB Type-C connector 730.

If the electronic device 700 and the external electronic device 740 are connected through the connector 730, at operation 1420 the processor 710 identifies device identification information (PID) of the external electronic device based on information received through a CC pin of the USB Type-C connector 730.

At operation 1430, the processor 710 transmits encryption information for authenticating the external electronic device or command information for controlling the external electronic device through the CC pin of the USB Type-C connector 730.

According to various embodiments of the present disclosure, the processor 710 can transmit the information to the external electronic device 740 by using a plurality of VDMs or a single VDM according to the size of data to be transmitted to the external electronic device. In case of using a plurality of VDMs, the VDM structure illustrated in FIGS. 9A to 9C can be used. In case of using a single VDM, the VDM structure illustrated in FIGS. 8A and 8B can be used.

According to various embodiments of the present disclosure, the processor 710 can identify a data type (e.g., long data type or short data type) included in the second VDM header 830 of the received VDM. The processor 710 can extract data included in the VDM based on the identified data type.

A method for controlling an external electronic device connected to a USB Type-C connector 310 or 730 of an electronic device according to various embodiments of the present disclosure may comprise the operations of identifying whether an external electronic device 740 is connected through a USB Type-C connector including at least one configuration channel (CC) pin, identifying device identification information of the external electronic device based on information received from the external electronic device through the CC pin, and transmitting vendor defined messages (VDMs) including encrypted information used for authenticating the external electronic device or command information for controlling the external electronic device to the external electronic device through the CC pin.

In the method for controlling an external electronic device connected to a USB Type-C connector of an electronic device according to various embodiments of the present disclosure, the VDM may sequentially comprise a message header 810 or 910, a first VDM header 820 or 920, and a second VDM header 830 or 930 including a product identifier and a data type.

In the method for controlling an external electronic device connected to a USB Type-C connector of an electronic device according to various embodiments of the present disclosure, the data type may comprise a first type or a second type, and a data size of the second type may be greater than a data size of the first type.

In the method for controlling an external electronic device connected to a USB Type-C connector of an electronic device according to various embodiments of the present disclosure, if the data type is a first data type, the VDM may further comprise data related to at least one of authentication, compatibility, and a control signal of an external electronic device connected to the electronic device. The data may be included subsequent to the second VDM header 830.

In the method for controlling an external electronic device connected to a USB Type-C connector of an electronic device according to various embodiments of the present disclosure, if the data type is a second type, the VDM may sequentially comprise a part of a data header 940, authentication, and data related to compatibility 950 to the second VDM header.

In the method for controlling an external electronic device connected to a USB Type-C connector of an electronic device according to various embodiments of the present disclosure, the VDM may comprise a data trailer 960 subsequent to a part of the data, and the data trailer may comprise integrity information of the data.

In the method for controlling an external electronic device connected to a USB Type-C connector of an electronic device according to various embodiments of the present disclosure, the second VDM header 830 or 930 may comprise a command type indicating whether the packet is in an initialization command (INITIATOR), acknowledge response (RESPONSE ACK), negative acknowledgement response (RESPONSE NAK), or in-use (BUSY) state.

In the method for controlling an external electronic device connected to a USB Type-C connector of an electronic device according to various embodiments of the present disclosure, the second VDM header 830 or 930 may comprise an indicator indicating the number of VDMs.

In the method for controlling an external electronic device connected to a USB Type-C connector of an electronic device according to various embodiments of the present disclosure, the data header 940 may comprise, among VDMs included in the packet, an indicator indicating the order of VDMs having the data header, size of data included in the packet, and size of data included in a VDM having the data header.

In the method for controlling an external electronic device connected to a USB Type-C connector of an electronic device according to various embodiments of the present disclosure, if the data type is the first type, data can combine with the second VDM header 830.

An electronic device and a method for controlling an external electronic device connected to a USB Type-C connector of the electronic device according to various embodiments of the present disclosure can transmit data having a large capacity by using a plurality of VDMs.

Further, the electronic device and the method for controlling an external electronic device connected to a USB Type-C connector of the electronic device according to various embodiments of the present disclosure can identify an external electronic device correctly because a VDM including a product identifier is generated in a structure defined by the VDM. Further, the electronic device and the method for controlling an external electronic device connected to a USB Type-C connector of the electronic device according to various embodiments of the present disclosure can authenticate an external electronic device connected to the electronic device because authentication data having a large capacity can be transmitted by using a VDM.

The method above is described with reference to flowcharts, methods, and computer program products according to embodiments of the present disclosure. It will be understood that each block of the flowcharts, and combinations of blocks in the flowcharts, may be implemented by computer program instructions. The computer program instructions may be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. The computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Each block of the flowcharts may represent a module, a segment, or a portion of code, which includes one or more executable instructions for implementing the specified logical function(s). It should also be noted that in some alternative implementations, the functions noted in the blocks may occur out of order. For example, two blocks shown in succession may, in fact, be executed substantially concurrently or the blocks may sometimes be executed in the reverse order, depending upon the functionality involved.

Certain aspects of the present disclosure may also be embodied as computer readable code on a non-transitory computer readable recording medium. A non-transitory computer readable recording medium is any data storage device that may store data which may be thereafter read by a computer system. Examples of a non-transitory computer readable recording medium include a ROM, a RAM, compact disc-ROMs (CD-ROMs), magnetic tapes, floppy disks, and optical data storage devices. A non-transitory computer readable recording medium may also be distributed over network coupled computer systems so that computer readable code is stored and executed in a distributed fashion. In addition, functional programs, code, and code segments for accomplishing the present disclosure may be easily construed by programmers skilled in the art to which the present disclosure pertains.

Embodiments of the present disclosure may involve the processing of input data and the generation of output data to some extent. The input data processing and output data generation may be implemented in hardware or software in combination with hardware. For example, certain electronic components may be employed in a mobile device or similar or related circuitry for implementing the functions associated with the various embodiments of the present disclosure. Alternatively, one or more processors operating in accordance with stored instructions may implement the functions associated with the embodiments of the present disclosure. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure may be easily construed by programmers skilled in the art to which the present disclosure pertains.

Aspects of the embodiments of the present disclosure may be implemented in hardware, firmware or via the execution of software or computer code that may be stored in a recording medium such as a CD ROM, a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods of the present disclosure may be rendered via such software that is stored on the recording medium using a general purpose computer, or a special processor or in programmable or dedicated hardware, such as an ASIC or an FPGA. As would be understood in the art, a computer, a processor, a microprocessor controller or programmable hardware include memory components, e.g., RAM, ROM, flash memory, etc. that may store or receive software or computer code that when accessed and executed by the computer, the processor or the hardware implement the methods of the present disclosure.

While the present disclosure has been illustrated and described with reference to various embodiments thereof, it will be understood by those skilled in the art that various changes in form and details may be made therein without departing from the scope of the present disclosure as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a housing;
   a USB Type-C connector configured to be connected to the housing or exposed through the housing, and including at least one configuration channel (CC) pin;
   a circuit configured to be disposed in the housing and connected electrically to the connector; and
   a processor configured to be disposed in the housing and connected electrically to the circuit,
   wherein the circuit is configured to transmit and receive at least one vendor defined message (VDM) through the CC pin, and
   wherein the VDM sequentially includes:
      a message header;
      a first VDM header;
      a second VDM header including a product identifier and a data type;
      a data header including at least part of data to be transmitted; and
      a vendor defined object (VDO), and
   wherein the processor is configured to:
      identify a size of the data to be transmitted;
      determine whether to use a plurality of VDMs or a single VDM to transmit the data based on the identified size of the data;
      in response to determining to use the plurality of VDMs, generate the plurality of VDMs, wherein the data header included in each of the plurality of VDMs includes a different part of the data; and
      control the circuit to transmit the plurality of VDMs.

2. The electronic device of claim 1, wherein the data type includes a first type or a second type, and a data size of the second type is greater than a data size of the first type.

3. The electronic device of claim 2, wherein, if the data type is the first type, data combines with the second VDM header.

4. The electronic device of claim 2, wherein, if the data type is the first type, the VDM further includes data related to at least one of authentication, compatibility, or a control signal of an external electronic device connected to the electronic device, and the data is included subsequent to the second VDM header.

5. The electronic device of claim 2, wherein, if the data type is the second type, the VDM sequentially includes a part of the data header, authentication, and data related to compatibility subsequent to the second VDM header.

6. The electronic device of claim 5, wherein the VDM includes a data trailer subsequent to a part of the data, and the data trailer includes integrity information of the data.

7. The electronic device of claim 5, wherein the data header includes, among VDMs included in VDM, an indicator indicating an order of VDMs including the data header, size of data included in the VDM, and size of data included in a VDM including the data header.

8. The electronic device of claim 1, wherein the second VDM header includes a command type indicating whether the VDM is in an initialization command (INITIATOR), acknowledge response (RESPONSE ACK), negative acknowledgement response (RESPONSE NAK), or in-use (BUSY) state.

9. The electronic device of claim 1, wherein the electronic device is one of a mobile computing device, dock, or accessory device.

10. The electronic device of claim 1, wherein the second VDM header includes an indicator indicating a number of VDMs.

11. A method for operating an electronic device, the method comprising:
    identifying whether an external electronic device is connected through a USB Type-C connector including at least one configuration channel (CC) pin;
    identifying device identification information of the external electronic device based on information received from the external electronic device through the CC pin; and
    transmitting at least one vendor defined (VDM) including encrypted information for authenticating the external electronic device or command information for controlling the external electronic device to the external electronic device through the CC pin,
    wherein the VDM sequentially includes:
        a message header;
        a first VDM header;
        a second VDM header including a product identifier and a data type;
        a data header including at least part of data to be transmitted; and
        a vendor defined object (VDO), and
    wherein transmitting the VDMs comprises:
        identifying a size of the data to be transmitted;
        determining whether to use a plurality of VDMs or a single VDM to transmit the data based on the identified size of the data;
        in response to determining to use the plurality of VDMs, generating the plurality of VDMs, wherein the data header included in each of the plurality of VDMs includes a different part of the data; and
        transmitting the plurality of VDMs.

12. The method of claim 11, wherein the VDM includes a data trailer subsequent to a part of the data, and the data trailer includes integrity information of the data.

13. The method of claim 11, wherein the second VDM header includes a command type indicating whether a VDM is in an initialization command (INITIATOR), acknowledge response (RESPONSE ACK), negative acknowledgement response (RESPONSE NAK), or in-use (BUSY) state.

14. The method of claim 11, wherein the second VDM header includes an indicator indicating a number of VDMs.

15. The method of claim 11, wherein the data type includes a first type or a second type, and a data size of the second type is greater than a data size of the first type.

16. The method of claim 15, wherein, if the data type is the first type, data combines with the second VDM header.

17. The method of claim 15, wherein, if the data type is the first type, the VDM further includes data related to at least one of authentication, compatibility, and a control signal of an external electronic device connected to the electronic device, and the data is included subsequent to the second VDM header.

18. The method of claim 15, wherein, if the data type is the second type, the VDM sequentially includes a part of the data header, authentication, and data related to compatibility subsequent to the second VDM header.

19. The method of claim 18, wherein the data header includes, among VDMs included in a VDM, an indicator indicating an order of VDMs including the data header, size of data included in the VDM, and size of data included in a VDM including the data header.

* * * * *